US011102806B2

(12) United States Patent
Choi et al.

(10) Patent No.: US 11,102,806 B2
(45) Date of Patent: Aug. 24, 2021

(54) METHOD FOR MULTIPLEXING UPLINK CONTROL INFORMATION IN WIRELESS COMMUNICATION SYSTEM, AND APPARATUS USING SAME

(71) Applicant: WILUS INSTITUTE OF STANDARDS AND TECHNOLOGY INC., Gyeonggi-do (KR)

(72) Inventors: Kyungjun Choi, Seoul (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 17/089,334

(22) Filed: Nov. 4, 2020

(65) Prior Publication Data

US 2021/0092762 A1  Mar. 25, 2021

Related U.S. Application Data

(63) Continuation of application No. PCT/KR2019/005718, filed on May 13, 2019.

(30) Foreign Application Priority Data

May 11, 2018 (KR) .................. 10-2018-0054148
Aug. 10, 2018 (KR) .................. 10-2018-0093859
Aug. 17, 2018 (KR) .................. 10-2018-0096384

(51) Int. Cl.
*H04W 72/12* (2009.01)
*H04L 1/18* (2006.01)

(52) U.S. Cl.
CPC ....... *H04W 72/1289* (2013.01); *H04L 1/1887* (2013.01); *H04L 1/1893* (2013.01)

(58) Field of Classification Search
CPC . H04W 72/1289; H04L 1/1887; H04L 1/1893
(Continued)

(56) References Cited

U.S. PATENT DOCUMENTS

2012/0269103 A1* 10/2012 Papasakellariou .... H04L 1/1621
370/280
2014/0064159 A1* 3/2014 Larsson ................ H04L 1/1607
370/280
(Continued)

FOREIGN PATENT DOCUMENTS

KR  10-2014-0070526  6/2014
KR  10-1724220  4/2017
(Continued)

OTHER PUBLICATIONS

International Search Report for PCT/KR2019/005718 dated Sep. 5, 2019 and its English translation from WIPO (now published as WO 2019/216729).

(Continued)

*Primary Examiner* — Peter G Solinsky
(74) *Attorney, Agent, or Firm* — Ladas & Parry, LLP

(57) ABSTRACT

A base station of a wireless communication is disclosed. A wireless communication base station comprises a communication module and a processor. The processor receives DCI of a physical downlink control channel (PDCCH) for scheduling a physical uplink shared channel (PUSCH) transmission over a plurality of slots and multiplexes hybrid automatic repeat request (HARQ)-ACK information to the PUSCH transmission by applying a value in a downlink assignment index (DAI) field of the DCI to each slot where the HARQ-ACK information is multiplexed to the PUSCH transmission over the plurality of slots.

19 Claims, 19 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2014/0293893 | A1* | 10/2014 | Papasakellariou | ......................... H04W 72/0446 370/329 |
| 2015/0003302 | A1* | 1/2015 | Ekpenyong | ........... H04W 72/14 370/280 |
| 2016/0270060 | A1* | 9/2016 | Kusashima | ........... H04L 5/1415 |
| 2017/0012743 | A1 | 1/2017 | Papasakellariou et al. | |
| 2017/0170931 | A1* | 6/2017 | Kusashima | ........... H04L 1/1867 |
| 2017/0273056 | A1* | 9/2017 | Papasakellariou | .. H04W 52/143 |
| 2017/0280454 | A1* | 9/2017 | Kusashima | ........... H04L 5/0055 |
| 2017/0332374 | A1 | 11/2017 | Koorapaty et al. | |
| 2018/0167931 | A1* | 6/2018 | Papasakellariou | .... H04L 5/0053 |
| 2019/0069321 | A1* | 2/2019 | Akkarakaran | ........ H04L 5/0091 |
| 2019/0103943 | A1* | 4/2019 | Wang | ................... H04L 1/1861 |
| 2019/0320431 | A1* | 10/2019 | Huang | ................. H04W 72/14 |
| 2019/0364592 | A1* | 11/2019 | Bhattad | ............. H04W 72/0446 |
| 2020/0186301 | A1* | 6/2020 | Nunome | ............... H04L 1/1861 |
| 2020/0228231 | A1* | 7/2020 | Fan | ....................... H04L 5/0094 |
| 2020/0259625 | A1* | 8/2020 | Papasakellariou | ........ H04L 1/08 |
| 2020/0296715 | A1* | 9/2020 | Wang | .................... H04L 1/1854 |
| 2020/0322097 | A1* | 10/2020 | Hsieh | ................... H04L 1/1854 |
| 2020/0322120 | A1* | 10/2020 | Yang | .................... H04L 5/0055 |
| 2020/0351129 | A1* | 11/2020 | Kwak | ............... H04W 72/0493 |
| 2020/0389277 | A1* | 12/2020 | Jia | ............................ H04L 1/00 |

FOREIGN PATENT DOCUMENTS

| | | |
|---|---|---|
| KR | 10-2017-0053470 | 5/2017 |
| WO | 2019/216729 | 11/2019 |

OTHER PUBLICATIONS

Written Opinion of the International Searching Authority for PCT/KR2019/005718 dated Sep. 5, 2019 and its English translation by Google Translate (now published as WO 2019/216729).

* cited by examiner

METHOD FOR MULTIPLEXING UPLINK CONTROL INFORMATION IN WIRELESS COMMUNICATION SYSTEM, AND APPARATUS USING SAME

TECHNICAL FIELD

The present invention relates to a wireless communication system. Specifically, the present invention relates to a method for multiplexing uplink control information in a wireless communication system and an apparatus using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DETAILED DESCRIPTION OF THE INVENTION

Technical Problem

An objective of an embodiment of the present invention is to provide a method for efficiently transmitting signals in a wireless communication system and an apparatus therefor. In addition, another objective of an embodiment of the present invention is to provide a method for multiplexing uplink control information in a wireless communication system and an apparatus using the same.

Technical Solution

A user equipment according to an embodiment of the present invention in a wireless communication system may include: a communication module; and a processor configured to control the communication module, wherein the processor is configured to receive DCI of a PDCCH (physical downlink control channel) scheduling transmission of a PUSCH (physical uplink shared channel) over a plurality of slots, and multiplex the HARQ-ACK information to PUSCH transmission by applying a value of the downlink assignment index (DAI) field of the DCI to each slot in which hybrid automatic repeat request (HARQ)-ACK information is multiplexed to PUSCH transmission on the plurality of slots.

The processor may determine the number of bits of the HARQ-ACK information according to the value of the DAI field of the DCI in every slot in which the HARQ-ACK information is multiplexed with the PUSCH transmission over the plurality of slots.

the processor may determine the remainder obtained by dividing the number of bits of the HARQ-ACK information by 4 according to the value of the DAI field of the DCI in every slot in which the HARQ-ACK information is multiplexed with the PUSCH transmission over the plurality of slots when a dynamic HARQ-ACK codebook is configured for the user equipment.

The processor may not multiplex the HARQ-ACK information with the PUSCH transmission in a slot in which the wireless communication user equipment is not to transmit the HARQ-ACK information together with a PUCCH (physical uplink control channel) when there is no PUSCH transmission over the plurality of slots.

The processor may not multiplex the HARQ-ACK information with the PUSCH transmission over the plurality of slots in a specific slot when the wireless communication user equipment fails to receive a PDSCH of which the successful or unsuccessful reception is indicated by HARQ-ACK information to be transmitted in the specific slot, which is one of the plurality of slots.

The processor may not multiplex the HARQ-ACK information with the PUSCH transmission over the plurality of slots in a specific slot when the wireless communication user equipment fails to receive a PDCCH scheduling transmission of a PUCCH including HARQ-ACK information to be transmitted in the specific slot, which is one of the plurality of slots.

The processor may multiplex the HARQ-ACK information, in which the successful or unsuccessful reception of the PDSCH is configured as NACK, with the PUSCH transmission over the plurality of slots in the slot other than the slot indicated by a PDSCH-to-HARQ_feedback timing indicator field of DCI for scheduling PDSCH (physical uplink shared channel) transmission.

The processor may not multiplex the HARQ-ACK information with the PUSCH transmission over the plurality of slots in the slot other than the slot indicated by a PDSCH-to-HARQ_feedback timing indicator field of DCI for scheduling a PDSCH (physical uplink shared channel).

the processor may multiplex the HARQ-ACK information with the PUSCH transmission over the plurality of slots in a specific slot. The processing timing condition may be determined according to a minimum time required for the user equipment to receive the PDCCH and to generate valid HARQ-ACK information when the specific slot, which is one of the plurality of slots, satisfies a processing timing condition for a PDSCH (physical uplink shared channel) of which the successful or unsuccessful reception is indicated by the HARQ-ACK information and a PDCCH scheduling the PUCCH (physical uplink control channel) transmission including the HARQ-ACK information.

the processor may not multiplex the HARQ-ACK information with the PUSCH transmission over the plurality of slots in a specific slot when the specific slot, which is one of the plurality of slots, does not satisfy a processing timing condition for a PDSCH of which the successful or unsuccessful reception is indicated by the HARQ-ACK information and a PDCCH scheduling the PUCCH transmission including the HARQ-ACK information.

the processor may set a bit of the HARQ-ACK information corresponding to a PDSCH that does not satisfy a processing timing condition to NACK when the specific slot, which is one of the plurality of slots, does not satisfy the processing timing condition for a PDSCH of which the successful or unsuccessful reception is indicated by the HARQ-ACK information and a PDCCH for scheduling the PUCCH transmission including the HARQ-ACK information.

The processor may determine the processing timing condition on the basis of the position of the latest symbol of a PDSCH of which the successful or unsuccessful reception is indicated by the HARQ-ACK information and the position of the earlier symbol of a start symbol of a PUCCH including the HARQ-ACK information and a start symbol of PUSCH transmission over the plurality of slots.

A method of operating a user equipment in a wireless communication system according to an embodiment of the present invention may include receiving DCI of a PDCCH (physical downlink control channel) scheduling transmission of PUSCH (physical uplink shared channel) transmission over a plurality of slots and multiplexing the HARQ-ACK information to PUSCH transmission by applying a value of the downlink assignment index (DAI) field of the DCI to each slot in which hybrid automatic repeat request (HARQ)-ACK information is multiplexed to PUSCH transmission on the plurality of slot.

The multiplexing of the HARQ-ACK information may include determining the number of bits of the HARQ-ACK information according to the value of the DAI field of the DCI in every slot in which the HARQ-ACK information is multiplexed with the PUSCH transmission over the plurality of slots.

The determining of the number of bits of the HARQ-ACK information may include determining a remainder obtained by dividing the number of bits of the HARQ-ACK information by 4 according to the value of the DAI field of the DCI in every slot in which the HARQ-ACK information is multiplexed with the PUSCH transmission over the plurality of slots when a dynamic HARQ-ACK codebook is configured for the user equipment.

The multiplexing of the HARQ-ACK information may include not multiplexing the HARQ-ACK information with the PUSCH transmission in a slot in which the wireless communication user equipment is not to transmit the HARQ-ACK information together with a PUCCH (physical uplink control channel) when there is no PUSCH transmission over the plurality of slots.

The not multiplexing of the HARQ-ACK information may include not multiplexing the HARQ-ACK information with the PUSCH transmission over the plurality of slots in a specific slot when the wireless communication user equipment fails to receive a PDSCH of which the successful or unsuccessful reception is indicated by HARQ-ACK information to be transmitted in the specific slot, which is one of the plurality of slots.

The not multiplexing of the HARQ-ACK information may include not multiplexing the HARQ-ACK information with the PUSCH transmission over the plurality of slots in a specific slot when the wireless communication user equipment fails to receive a PDCCH scheduling transmission of a PUCCH including HARQ-ACK information to be transmitted in the specific slot, which is one of the plurality of slots.

The multiplexing of the HARQ-ACK information may include multiplexing the HARQ-ACK information, in which the successful or unsuccessful reception of the PDSCH is configured as NACK, with the PUSCH transmission over the plurality of slots in the slot other than the slot indicated by a PDSCH-to-HARQ_feedback timing indicator field of DCI for scheduling PDSCH (physical uplink shared channel) transmission.

The multiplexing of the HARQ-ACK information may include not multiplexing the HARQ-ACK information with the PUSCH transmission over the plurality of slots in the slot other than the slot indicated by a PDSCH-to-HARQ_feedback timing indicator field of DCI for scheduling a PDSCH (physical uplink shared channel).

Advantageous Effects

An embodiment of the present invention provides a method for efficiently multiplexing uplink control information in a wireless communication system and an apparatus using the same.

The effects obtainable in the present invention are not limited to the above-mentioned effects, and other effects not mentioned above may be clearly understood by those skilled in the art from the following description.

MODE FOR CARRYING OUT THE INVENTION

Figure 1:
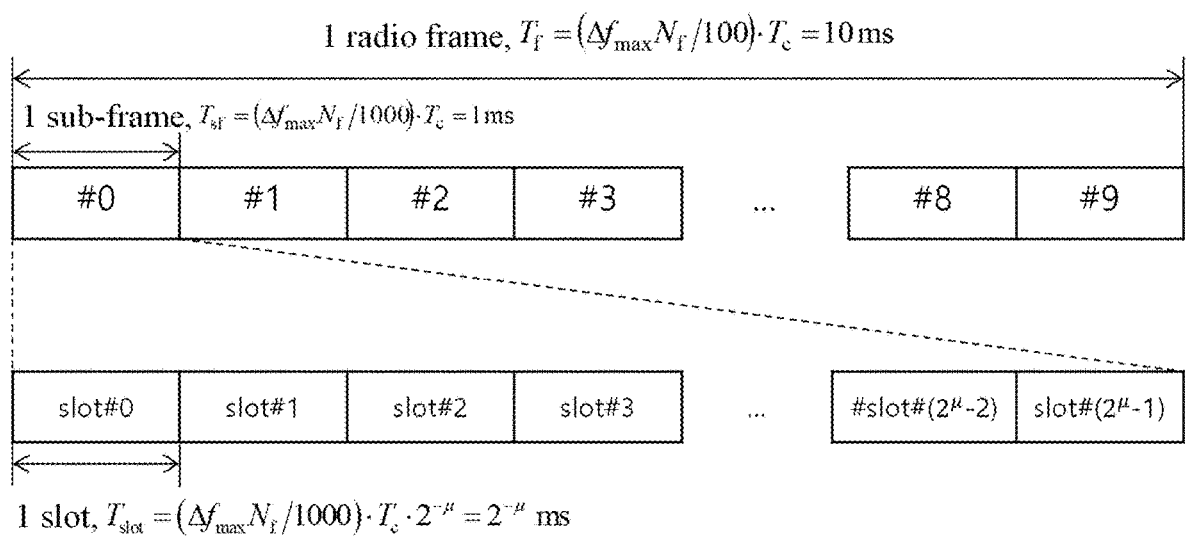
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE).

The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, although respective configurations will be separately described as independent embodiments in order to assist in understanding the description, the respective embodiments may be used in combination with each other. In the disclosure, the configuration of a UE may indicate the configuration by a base station.

Specifically, the base station may transmit a channel or a signal to the UE so as to configure values of parameters used in the operation of the UE or a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*Nf,\, ref)$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^p$ kHz, and p can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2\mu$ slots. In this case, the length of each slot is $2-\mu$ ms. Numbers from 0 to $2\mu-1$ may be respectively allocated to $2\mu$ slots within one subframe. In addition, numbers from 0 to $10*2\mu-1$ may be respectively allocated to slots within one wireless frame. The time resource may be distinguished by at least one of a wireless frame number (also referred to as a wireless frame index), a subframe number (also referred to as a subframe index), and a slot number (or a slot index).

Figure 2:
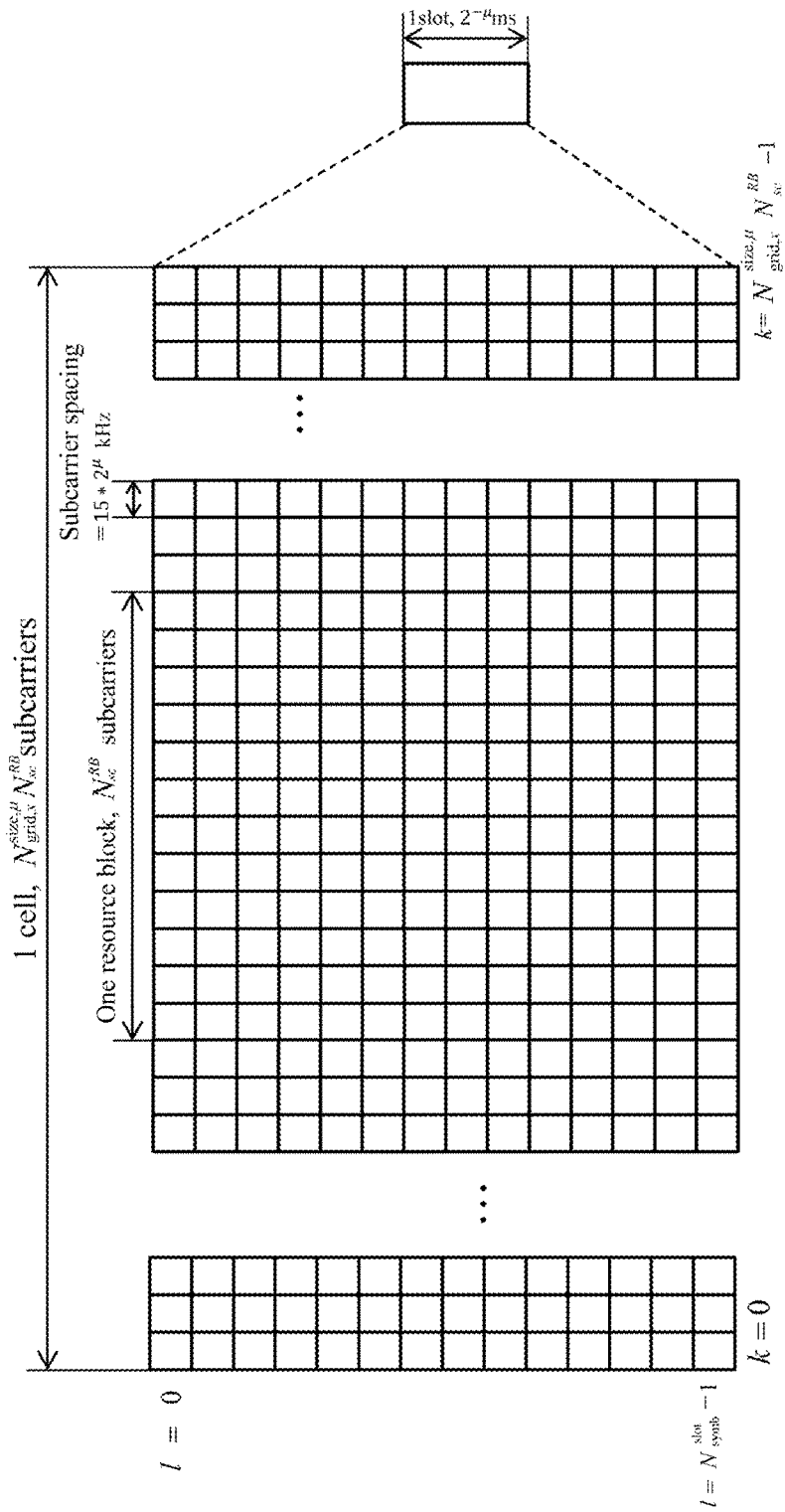
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |

TABLE 1-continued

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | L | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | D | D | D | D | D | X | X | U |
| 47 | D | D | X | U | U | U | D | D | X | U | U | U | U | U |
| 48 | D | X | U | U | U | U | D | X | U | U | U | U | U | U |
| 49 | D | D | D | D | X | U | D | D | D | D | X | X | X | U |
| 50 | D | D | X | X | U | U | D | D | X | X | U | U | U | U |
| 51 | D | X | X | U | U | U | D | X | X | U | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | D | D | D | D | D | D | D | D |
| 55 | D | D | X | X | X | U | U | U | D | D | D | D | D | D |
| 56~255 | | | | | | | Reserved | | | | | | | |

In Table 1, D denotes a DL symbol, U denotes a UL symbol, and X denotes a flexible symbol. As shown in Table 1, up to two DL/UL switching in one slot may be allowed.

Figure 3:
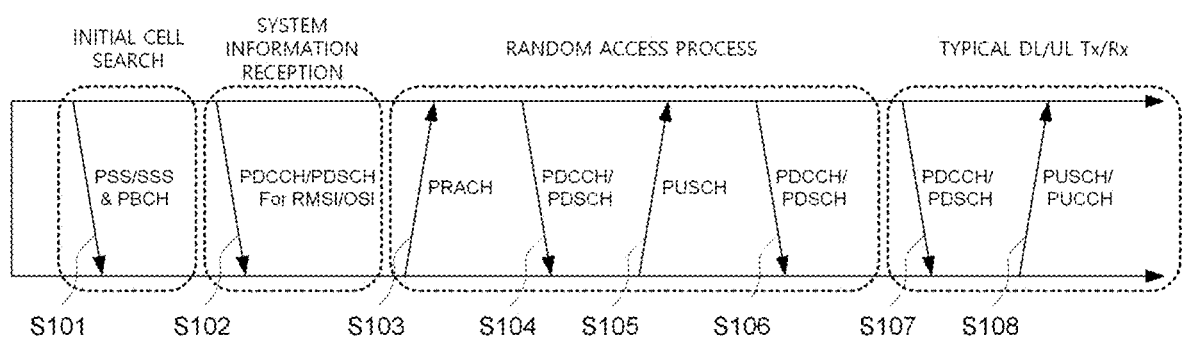
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information in order for the UE to normally operate in the physical layer in radio resource control (RRC), and is referred to as "remaining system information" or "system information block (SIB) 1".

When the UE initially accesses the base station or does not have radio resources for signal transmission (When the UE is in RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information necessary in order for the UE to normally operate in the physical layer in the RRC layer during the random access process. If the UE obtains UE-specific system information from the RRC layer, the UE enters an RRC_CONNECTED mode.

The RRC layer is used to generate and manage messages for control between a UE and a radio access network (RAN). More specifically, the base station and the UE may perform broadcasting of cell system information necessary for all UEs in the cell in the RRC layer, management of transmitting paging messages, mobility management and handover, measurement report of a UE and control thereof, storage management including UE capability management and existing management, and the like. In general, since the update of a signal transmitted in the RRC layer (hereinafter, referred to as an "RRC signal") is longer than the transmission/reception period {i.e., a transmission time interval (TTI)} in the physical layer, the RRC signal is able to be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
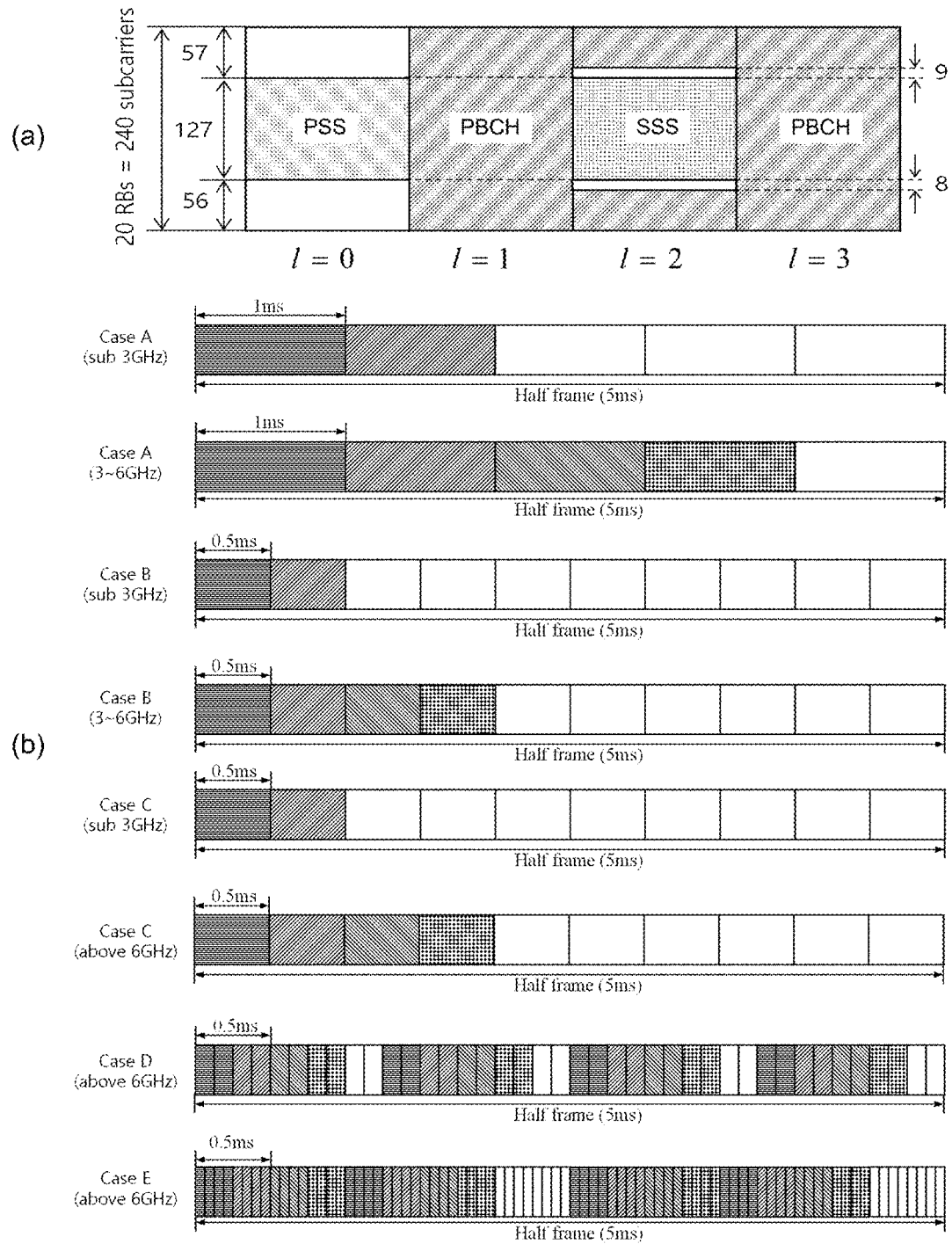
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A And Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/ relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N_{ID}^{(2)}) \bmod 127$$

$$0 \leq n < 127$$

Here, $x(i+7)=(x(i+4)+x(i)) \bmod 2$ and is given as $$[x(6)\ x(5)\ x(4)\ x(3)\ x(2)\ x(1)\ x(0)]=[1\ 1\ 1\ 0\ 1\ 1\ 0].$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15 \left\lfloor \frac{N_{ID}^{(1)}}{112} \right\rfloor + 5N_{ID}^{(2)}$$

-continued $$m_1 = N_{ID}^{(1)} \bmod 112$$

$$0 \le n < 127$$

Here, $$x_0(i+7) = (x_0(i+4) + x_0(i)) \bmod 2$$

$$x_1(i+7) = (x_1(i+1) + x_1(i)) \bmod 2$$

and is given as $$[x_0(6)\ x_0(5)\ x_0(4)\ x_0(3)\ x_0(2)\ x_0(1)\ x_0(0)] =$$
$$[0\ 0\ 0\ 0\ 0\ 0\ 1]$$
$$[x_1(6)\ x_1(5)\ x_1(4)\ x_1(3)\ x_1(2)\ x_1(1)\ x_1(0)] =$$
$$[0\ 0\ 0\ 0\ 0\ 0\ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
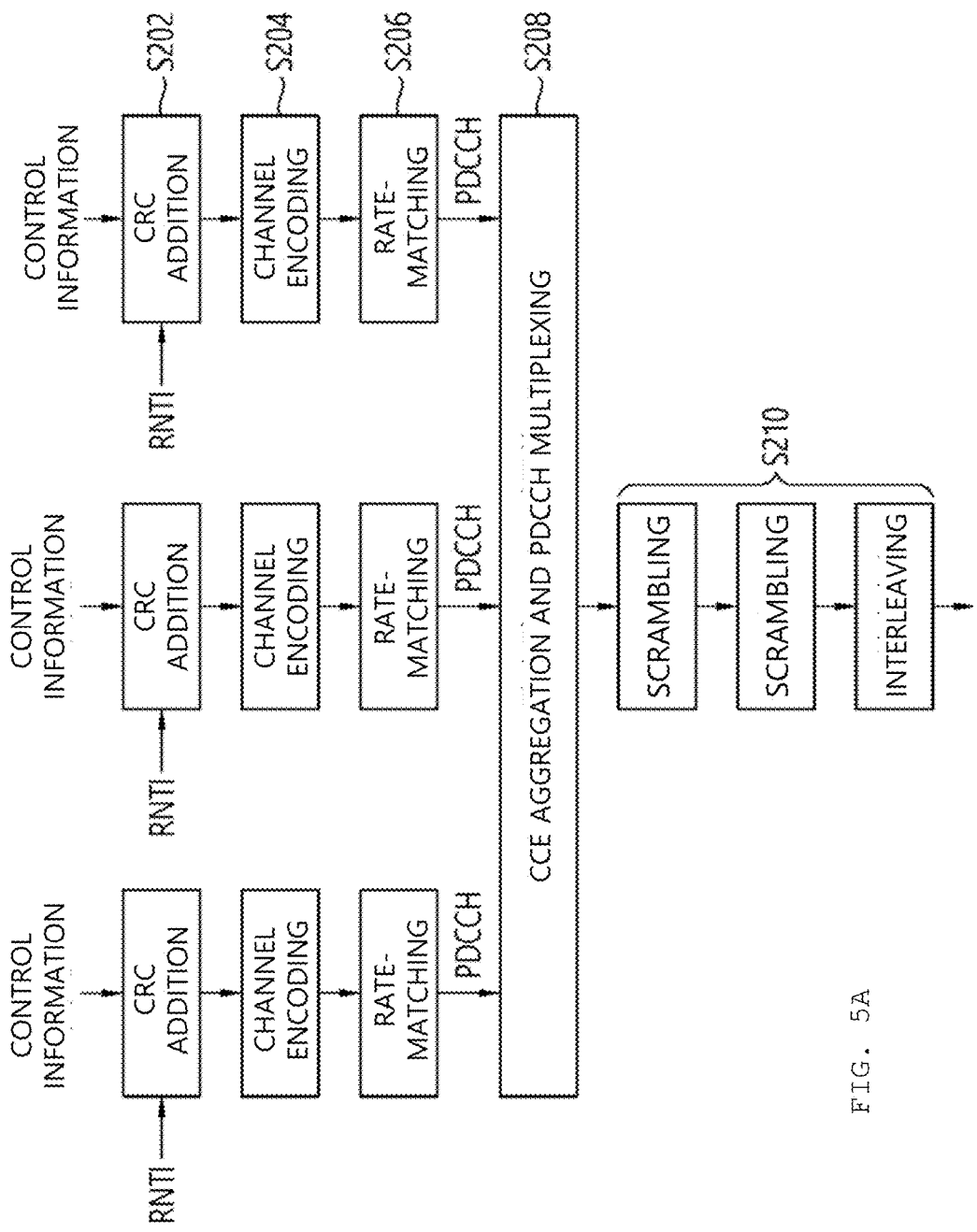
FIGS. 5A and 5B illustrate a procedure for transmitting control information and a control channel in a 3GPP NR system.
Figure 5B:
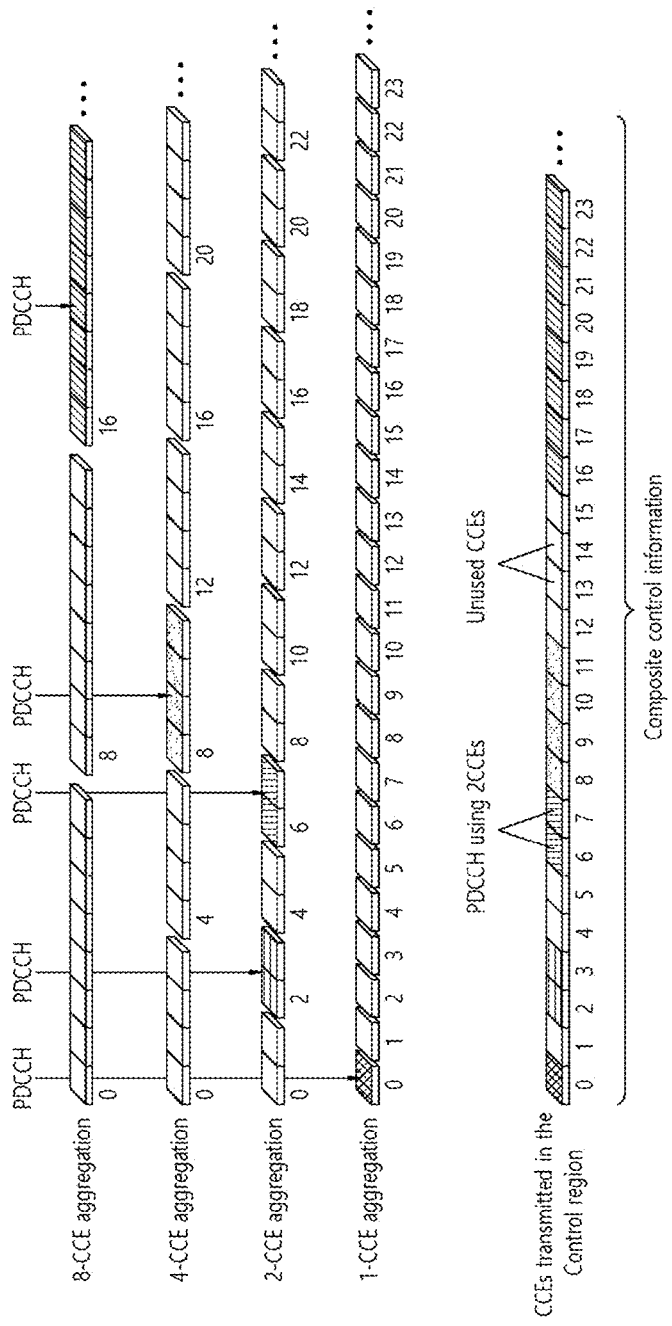

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
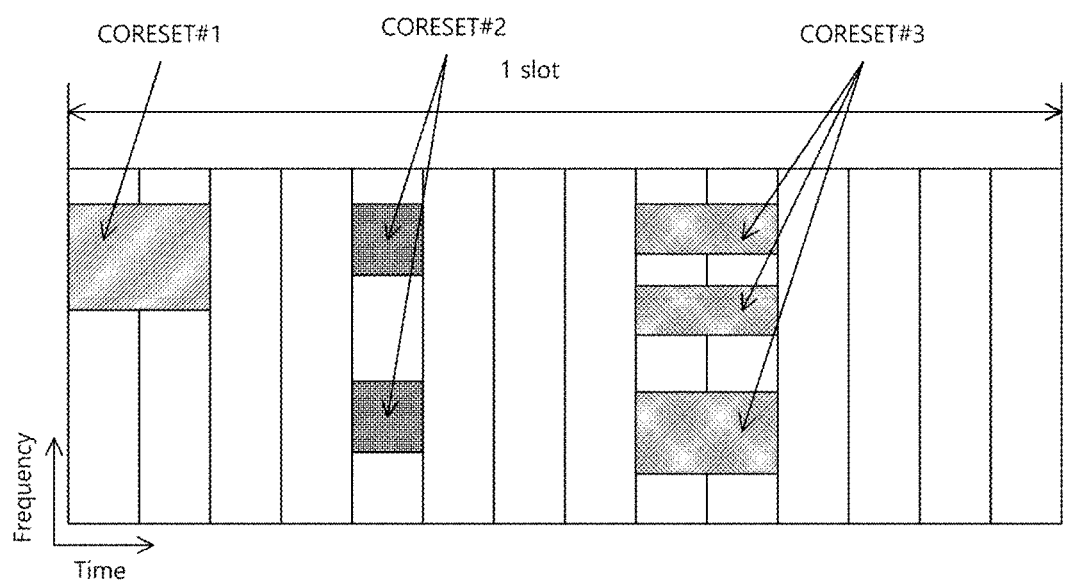
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
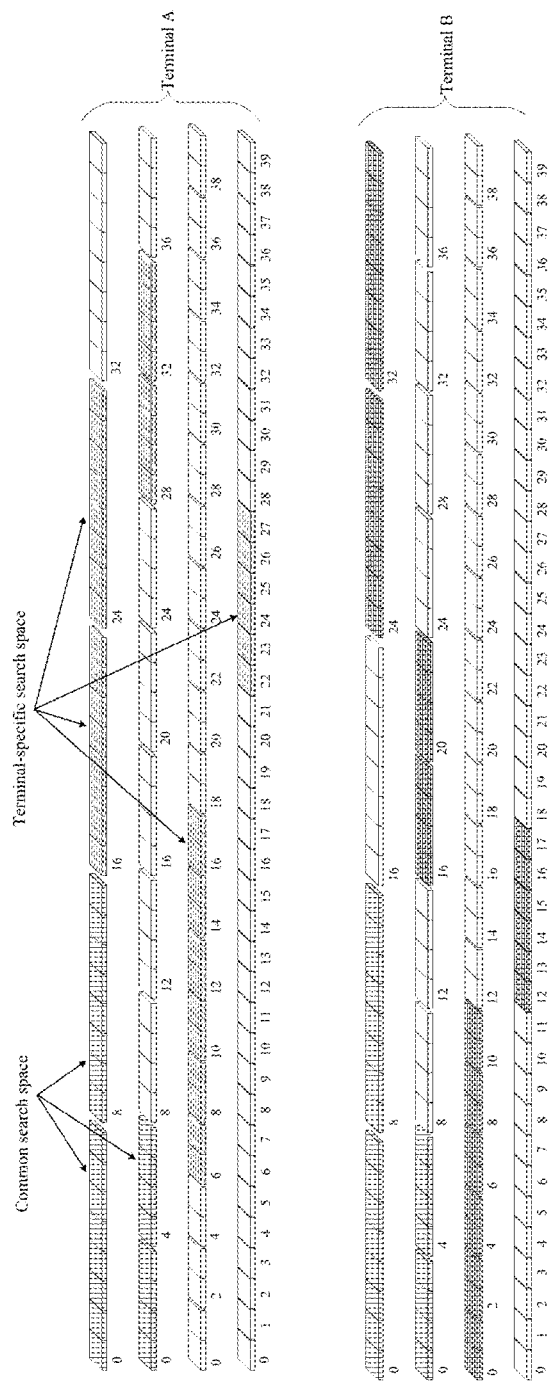
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a down-link-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH with the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR) Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is able to transmit 1 bit or 2 bits of HARQ-ACK information or SR. PUCCH format 0 may be transmitted through one or two OFDM symbols on the time axis and one PRB on the frequency axis. When PUCCH format 0 is transmitted through two OFDM symbols, the same sequence may be transmitted through different RBs in the two symbols. In this case, the sequence may be a sequence that is cyclically shifted (CS) from a base sequence used in PUCCH format 0. According to this, the UE may obtain frequency diversity gain. Specifically, the UE may determine a cyclic shift (CS) value $m_{cs}$ according to Mbit bits of UCI ($M_{bit}$=1 or 2). In addition, the sequence obtained by cyclically shifting a base sequence having a length of 12 based on a predetermined CS value $m_{cs}$ may be mapped to one OFDM symbol and 12 REs of one RB, and may then be transmitted. In the case where the number of cyclic shifts available to the UE is 12 and $M_{bit}$=1, 1-bit UCI 0 and 1 may be mapped to two cyclically shifted sequences in which the difference between the cyclic shift values is 6, respectively. In addition, when $M_{bit}$=2, 2 bits of UCI 00, 01, 11, and 10 may be mapped to four cyclically shifted sequences in which the difference between the cyclic shift values is 3, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is Mbit=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d (Msymbol−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates Mbit bits UCI ($M_{bit}$>2) with n/2-Binary Phase Shift Keying (BPSK) or QPSK to generate a complex valued symbol d(0) to d($M_{symb}$−1). Here, when using r/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in a 3GPP NR system, the UE may perform transmission/reception using a bandwidth less than or equal to the bandwidth of a carrier (or a cell). To this end, the UE may be configured with bandwidth parts (BWPs) including consecutive bandwidths of a portion of the bandwidth of a carrier. The UE, which operates according to TDD or operates in an unpaired spectrum, may be configured with up to 4 DL/UL BWP pairs for one carrier (or a cell). In addition, the UE may activate one DL/UL BWP pair. The UE, which operates according to FDD or operates in a paired spectrum, may be configured with up to 4 DL BWPs in a downlink carrier (or cell), and may be configured with up to 4 UL BWPs in an uplink carrier (or cell). The UE may activate one DL BWP and UL BWP for each carrier (or cell). The UE may or may not perform reception or transmission in time and frequency resources other than the activated BWPs. The activated BWP may be referred to as an "active BWP".

The base station may indicate an activated BWP, among the BWPs to be configured in the UE, through downlink control information (DCI). The BWP indicated through the DCI is activated, and other configured BWPs are deactivated. In a carrier (or cell) operating in TDD, the base station may include a BPI (bandwidth part indicator) indicating the BWP to be activated in the DCI for scheduling a PDSCH or PUSCH in order to change the DL/UL BWP pair of the UE. The UE may receive DCI for scheduling a PDSCH or a PUSCH, and may identify a DL/UL BWP pair to be activated based on the BPI. In the case of a downlink carrier (or cell) operating in FDD, the base station may include a BPI indicating the BWP to be activated in the DCI for scheduling a PDSCH in order to change the DL BWP of the UE. In the case of an uplink carrier (or cell) operating in FDD, the base station may include a BPI indicating the BWP to be activated in the DCI for scheduling a PUSCH in order to change the UL BWP of the UE.

Figure 8:
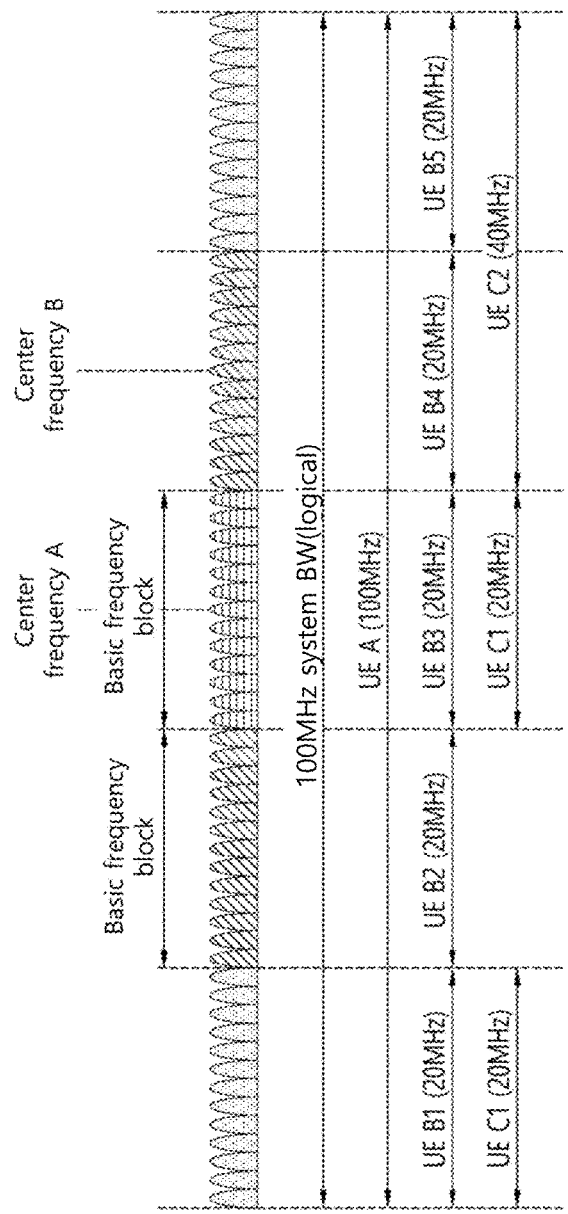
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
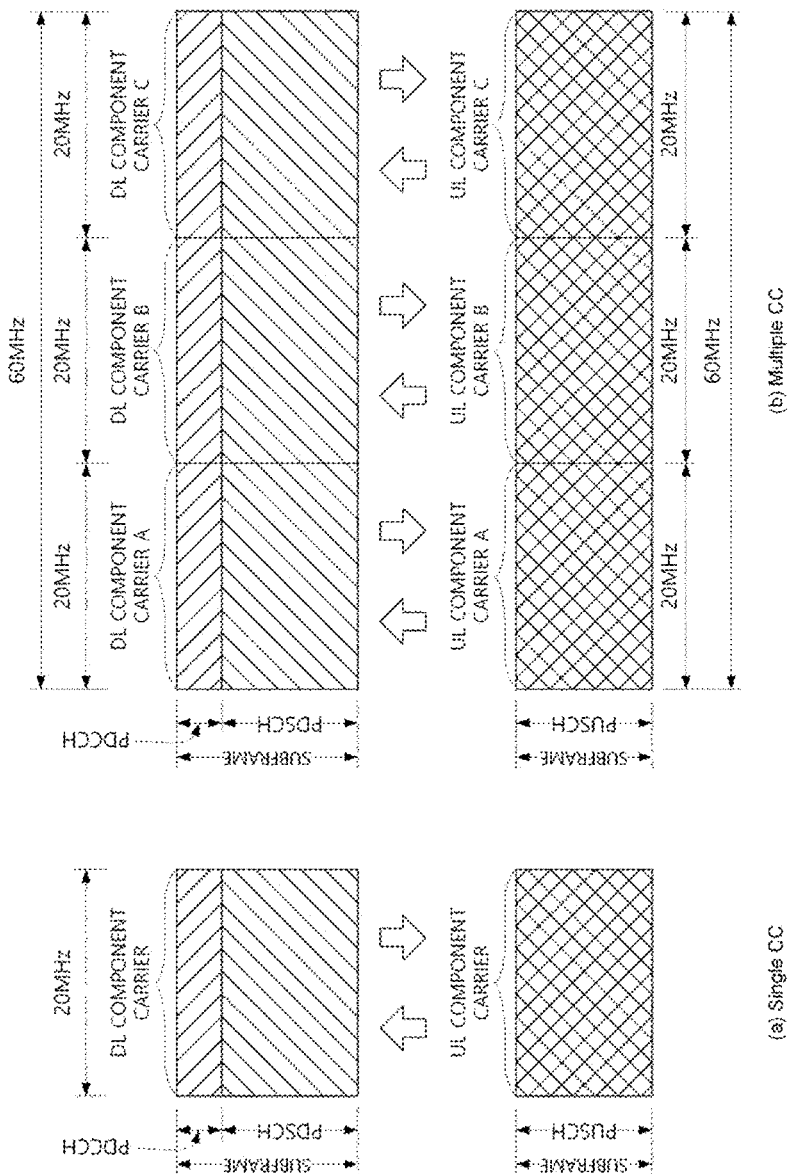
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs may not be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
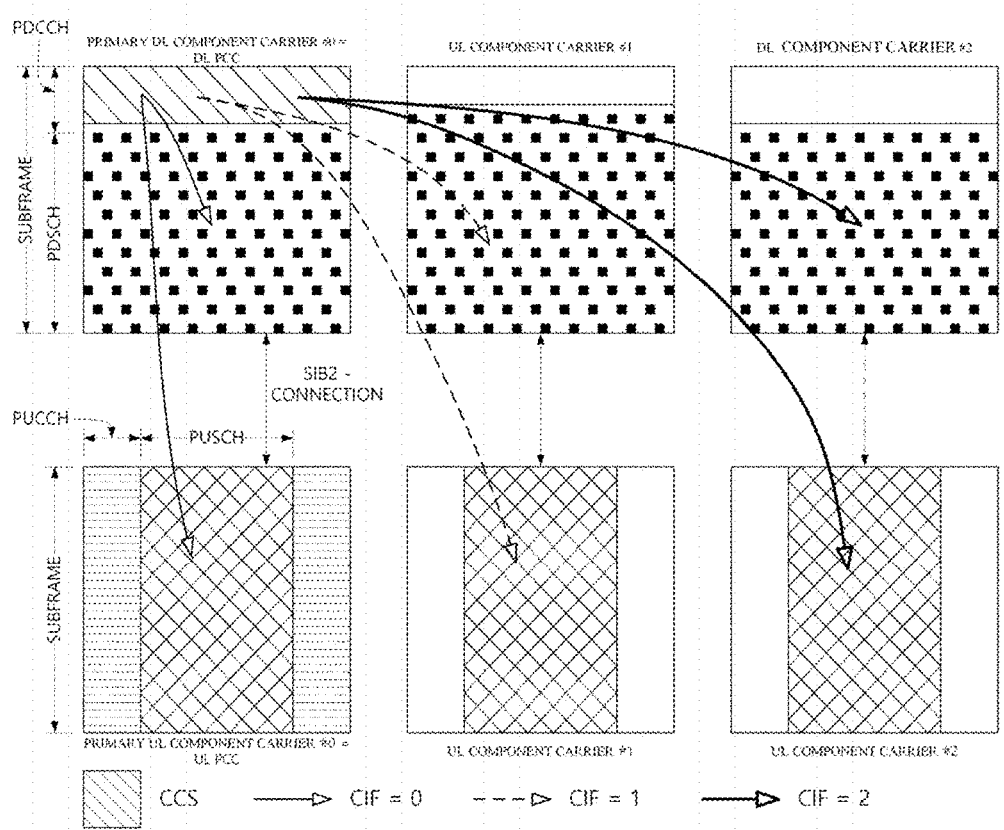
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
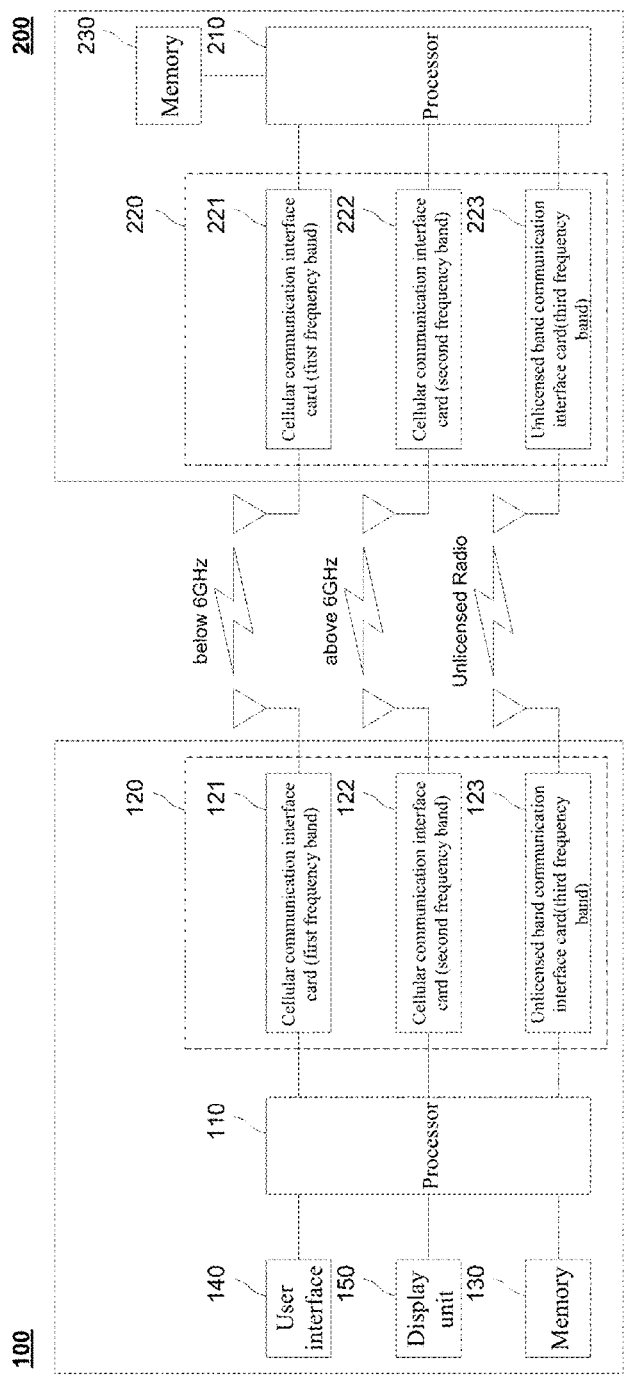
FIG. 11 is a block diagram illustrating configuration of a user equipment and a base station according to an embodiment of the present invention.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

If PUSCH transmission and PUCCH transmission including UCI overlap each other in any one slot, the UE may transmit a PUSCH together with uplink control information (UCI). Specifically, the UE may multiplex UCI with PUSCH transmission. In a specific embodiment, the UE may multiplex hybrid automatic repeat request (HARQ)-ACK information with PUSCH transmission. At this time, the UE may multiplex HARQ-ACK information with PUSCH transmission on the basis of the value of a UL-DAI (downlink assignment index) field. In this specification, the HARQ-ACK information indicates whether or not a PDSCH is successfully received. Specifically, the HARQ-ACK information may include one or more bits indicating the successful or unsuccessful reception of a PDSCH, and each beat may represent ACK or NACK.

A downlink assignment index (DAI) indicates information on the number of HARQ-ACKs included in a hybrid automatic repeat request (HARQ)-ACK codebook in which the UE indicates the successful or unsuccessful reception of a plurality of PDSCHs to the base station. The UE may receive a DAI through a PDCCH for scheduling a PDSCH. Specifically, the DAI may be classified into a counter-DAI and a total-DAI. The total-DAI indicates the number of PDSCHs transmitted through the same HARQ-ACK codebook. The counter-DAI indicates the sequence of a PDSCH among the PDSCHs indicated by the same total-DAI. The DCI for scheduling a PDSCH may include a value of the counter-DAI corresponding to the scheduled PDSCH. In addition, the DCI for scheduling a PDSCH may include a value of the total-DAI corresponding to the scheduled PDSCH.

If a dynamic HARQ-ACK codebook is configured for the UE, the DCI for scheduling a PUSCH may include a 2-bit or 4-bit UL-DAI field. In this specification, the UL-DAI field indicates a DAI field of DCI for scheduling PUSCH transmission. If TBG (transport block group)-based transmission is configured, the DCI for scheduling a PUSCH may include a 2-bit UL-DAI field. In the following description, "UL-DAI field" indicates the UL-DAI field of DCI for scheduling a PUSCH, unless stated otherwise. If CBG (code block group)-based transmission is configured, the DCI for scheduling a PUSCH may include a 4-bit UL-DAI field. The value of the 2-bit UL-DAI field may indicate the remainder obtained by dividing the number of PDSCHs, of which the successful or unsuccessful reception is indicated by the HARQ-ACK information to be multiplexed with PUSCH transmission, by 4. In a specific embodiment, if the value of the 2-bit UL-DAI field is 0 (i.e., $00_b$), the value of the 2-bit UL-DAI field may indicate that the remainder obtained by dividing the number of PDSCHs, of which the successful or unsuccessful reception is indicated by the HARQ-ACK information to be multiplexed with PUSCH transmission, by 4 is 1 (e.g., the number of PDSCHs of which the successful or unsuccessful reception is indicated by the HARQ-ACK information is 1, 5, 9, . . . ). In addition, in a specific embodiment, if the value of the 2-bit UL-DAI field is 1 (i.e., $01_b$), the value of the 2-bit UL-DAI field may indicate that the remainder obtained by dividing the number of PDSCHs, of which the successful or unsuccessful reception is indicated by the HARQ-ACK information to be multiplexed with PUSCH transmission, by 4 is 2 (e.g., the number of PDSCHs of which the successful or unsuccessful reception is indicated by the HARQ-ACK information is 2, 6, 10, . . . ). In addition, in a specific embodiment, if the value of the 2-bit UL-DAI field is 2 (i.e., $10_b$), the value of the 2-bit UL-DAI field may indicate that the remainder obtained by dividing the number of PDSCHs, of which the successful or unsuccessful reception is indicated by the HARQ-ACK information to be multiplexed with PUSCH transmission, by 4 is 3 (e.g., the number of PDSCHs of which the successful or unsuccessful reception is indicated by the HARQ-ACK information is 3, 7, 11, . . . ). Further, if the value of the 2-bit UL-DAI field is 3 (i.e., $11_b$), the value of the 2-bit UL-DAI field may indicate that the remainder obtained by dividing the number of PDSCHs, of which the successful or unsuccessful reception is indicated by the HARQ-ACK information to be multiplexed with PUSCH transmission, by 4 is 0 (e.g., the number of PDSCHs of which the successful or unsuccessful reception is indicated by the HARQ-ACK information is 0, 4, 8, . . . ).

If there is no HARQ-ACK information to be transmitted by the UE in the slot in which PUSCH transmission is performed, the UE may not multiplex HARQ-ACK information with PUSCH transmission according to the value of a UL-DAI field. For example, if a dynamic HARQ-ACK codebook is configured for the UE, if the value of a UL-DAI field is 3 (i.e., $11_b$), and if there is no HARQ-ACK information to be transmitted by the UE in the slot in which PUSCH transmission is performed, the UE may not multiplex HARQ-ACK information with PUSCH transmission. If the UE fails to receive any of the PDSCHs for scheduling TB-based transmission in the slot in which PUSCH transmission is performed, the UE may determine that there is no HARQ-ACK information on the TB-based transmission performed by the UE in the slot in which the PUSCH transmission is performed. The 2-bit total-DAI for CBG-based transmission may have a specific value, and the UE may fail to receive any of the PDSCHs for scheduling the CBG-based transmission in the slot in which PUSCH transmission is performed. At this time, the UE may determine that there is no HARQ-ACK information on the CBG-based transmission to be performed by the UE in the slot in which PUSCH transmission is performed. If the UE determines that there is no HARQ-ACK information on the TB-based transmission and no HARQ-ACK information on the CBG-based transmission, which are to be transmitted by the UE, in the slot in which PUSCH transmission is performed, the UE may not multiplex HARQ-ACK information with PUSCH transmission even if PUSCH transmission and PUCCH transmission including HARQ-ACK information overlap each other. If the value of the 2-bit UL-DAI of DCI for scheduling a PUSCH is 3 ($11_b$ in binary numbers), and if no DCI for scheduling a PDSCH corresponding to the HARQ-ACK included in PUCCH transmission, which overlaps PUSCH transmission in the time domain, is received, the UE may not multiplex HARQ-ACK information with PUSCH transmission.

In addition, when multiplexing HARQ-ACK information with PUSCH transmission, the UE may determine whether or not to multiplex the HARQ-ACK information with the PUSCH transmission on the basis of the value of a UL (uplink)-DAI field of DCI for scheduling a PUSCH. Specifically, if a semi-static HARQ-ACK codebook is configured for the UE, the DCI for scheduling a PUSCH may include a 1-bit UL-DAI field. At this time, the value of the 1-bit UL-DAI field may indicate whether or not HARQ-ACK information is multiplexed with PUSCH transmission. If the value of the 1-bit value UL-DAI field is 0, the UE may not multiplex HARQ-ACK information with PUSCH transmission, which is scheduled by the DCI. In addition, if the value of the 1-bit UL-DAI field is 1, the UE may multiplex HARQ-ACK information with PUSCH transmission, which is scheduled by the DCI. In this embodiment, the number of bits of the HARQ-ACK information is determined according to a method predetermined between the UE and the base station.

The UE may transmit a PUSCH over a plurality of slots. Specifically, the UE may repeatedly transmit a PUSCH in a plurality of slots. At this time, the UE may transmit a PUSCH in 2, 4, or 8 slots. As described above, repeated transmission of a PUSCH by the UE in a plurality of slots may be referred to as "slot aggregation". In this specification, repeated transmission of a PUSCH may indicate transmission of a PUSCH including a plurality of the same TBs or repeated transmission of a PUSCH including one TB. For the convenience of description, a unit of repetition including the same TB in a PUSCH will be referred to as a "repetition unit". The base station may inform the UE of information indicating a first PUSCH transmission or a time domain of transmission in a repetition unit included in PUSCH transmission, and the number of repetitions. The UE may repeatedly transmit a PUSCH on the basis of information indicating the first PUSCH transmission or the time domain of a repetition unit and the number of repetitions. In another specific embodiment, the base station may indicate, to the UE, time and frequency allocation information on each PUSCH transmission or repetition unit. The UE may repeatedly transmit a PUSCH according to the indicated time and frequency resource allocation information. If the UE transmits a PUSCH over a plurality of slots, and if PUSCH transmission and PUCCH transmission including UCI (e.g., HARQ-ACK information) overlap in the slot in which the PUSCH is transmitted, the UE may multiplex the UCI with the PUSCH transmission, thereby transmitting the PUSCH.

When the UE transmits a PUSCH over a plurality of slots, there may be a problem with a method in which the UE multiplexes UCI with PUSCH transmission. For example, there may be a problem with a method in which the UE determines whether or not to multiplex HARQ-ACK information with PUSCH transmission in each of a plurality of slots in which a PUSCH is transmitted. In addition, when the UE multiplexes HARQ-ACK information with PUSCH transmission, there may be a problem with a method in which the UE applies the value of a UL-DAI field in each of a plurality of slots. Specifically, when the UE multiplexes HARQ-ACK information with PUSCH transmission, there may be a problem with a method in which the UE determines the number of bits of HARQ-ACK information in each of a plurality of slots. In addition, even if the UE repeats PUSCH transmission in one slot, there may be a problem with a method of multiplexing HARQ-ACK information with the PUSCH transmission. For example, there may be a problem with a method in which the UE determines whether or not to multiplex HARQ-ACK information with PUSCH transmission in each of a plurality of units. In addition, when the UE multiplexes HARQ-ACK information with PUSCH transmission, there may be a problem with a method in which the UE applies the value of a UL-DAI field in each of a plurality of repetition units. Specifically, when the UE multiplexes HARQ-ACK information with PUSCH transmission, there may be a problem with a method in which the UE determines the number of bits of HARQ-ACK information in each of a plurality of repetition units. A detailed method of multiplexing HARQ-ACK information with PUSCH transmission will be described with reference to FIGS. 12 to 18. In addition, in this specification, multiplexing may indicate "piggybacking". Piggybacking and multiplexing may be used interchangeably with each other.

Figure 12:
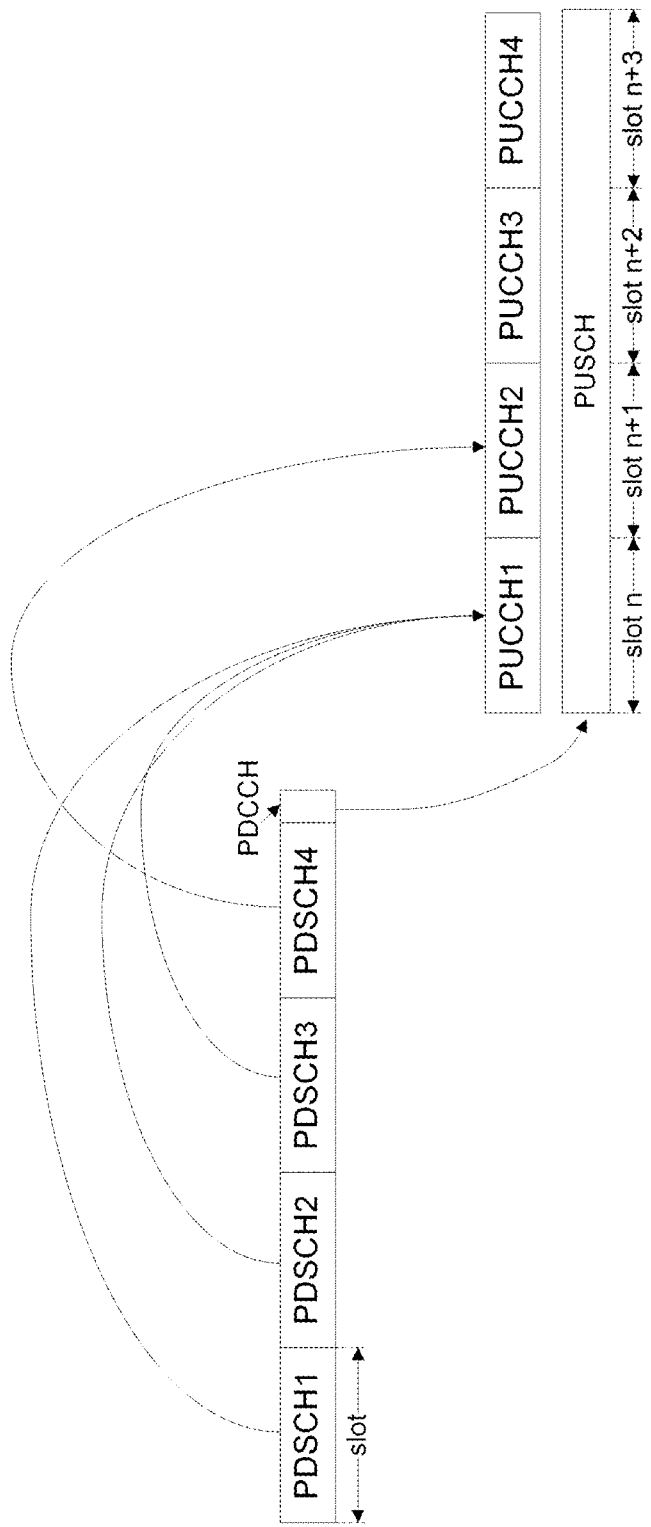
FIG. 12 illustrates an operation in which a user equipment multiplexes HARQ-ACK information with PUSCH transmission over a plurality of slots according to an embodiment of the present invention.

FIG. 12 illustrates an operation in which a UE multiplexes HARQ-ACK information with PUSCH transmission in a plurality of slots according to an embodiment of the present invention.

The UE may not multiplex HARQ-ACK information with PUSCH transmission in the slot in which the UE is not to transmit HARQ-ACK information together with a PUCCH if PUSCH transmission is absent. Specifically, the UE may determine whether or not to multiplex HARQ-ACK with PUSCH transmission for each of a plurality of slots in which the PUSCH transmission is performed. At this time, if the UE fails to receive a PDCCH or a PDSCH corresponding to HARQ-ACK information to be transmitted in a specific slot, the UE may not multiplex HARQ-ACK information with PUSCH transmission in the corresponding slot. The PDCCH corresponding to the HARQ-ACK information to be transmitted in the corresponding slot may be a PDCCH including DCI for scheduling a PUCCH including HARQ-ACK information, which is to be transmitted in the corresponding slot. However, if PDSCH transmission does not need to be scheduled through a PDCCH, such as an SPS PDSCH, the UE may not determine whether or not to receive the PDCCH corresponding to HARQ-ACK information. Even if the PDSCH transmission does not need to be scheduled through a PDCCH, and even if the UE fails to receive a PDCCH corresponding to HARQ-ACK information, the UE may receive a PDSCH corresponding to the HARQ-ACK information. At this time, the UE may multiplex the HARQ-ACK information with PUSCH transmission. In addition, the PDSCH corresponding to HARQ-ACK information to be transmitted in a corresponding slot may be a PDSCH indicating the successful or unsuccessful reception of HARQ-ACK to be transmitted in the corresponding slot. The PDCCH or PDSCH corresponding to HARQ-ACK information to be transmitted in a corresponding slot may be a PDCCH or PDSCH satisfying HARQ-ACK timing for the corresponding slot. The HARQ-ACK timing is indicated by DCI for scheduling a PDSCH, and indicates the number of slots between the slot including the latest symbol of a corresponding PDSCH and the slot including a PUCCH transmitting HARQ-ACK. In the embodiments described above, if the UE multiplexes HARQ-ACK information with PUSCH transmission in any one of a plurality of slots in which the PUSCH transmission is performed, and if the UE fails to receive a PDCCH corresponding to HARQ-ACK information to be transmitted in another slot, the UE may not multiplex the HARQ-ACK information with the PUSCH transmission in the another slot. The number of bits of the HARQ-ACK information multiplexed with the PUSCH transmission in each slot may be determined according to the value of a UL-DAI field of a PDCCH for scheduling PUSCH transmission.

In the embodiment shown in FIG. 12, PUSCH transmission is performed in the first slot (slot n) to the fourth slot (slot n+3). The UE multiplexes HARQ-ACK information with PUSCH transmission in each of the first slot (slot n) and the second slot (slot n+1). At this time, the PUSCH transmission in the first slot (slot n) overlaps transmission of a first PUCCH (PUCCH1) including HARQ-ACK information indicating the successful or unsuccessful reception of a first PDSCH (PDSCH1), a second PDSCH (PDSCH2), and a third PDSCH (PDSCH3). In addition, the PUSCH transmission in the second slot (slot n+1) overlaps transmission of a second PUCCH (PUCCH2) including HARQ-ACK information indicating the successful or unsuccessful reception of a fourth PDSCH (PDSCH4). The UE multiplexes the HARQ-ACK information indicating the successful or unsuccessful reception of the first PDSCH (PDSCH1), the second PDSCH (PDSCH2), and the third PDSCH (PDSCH3) with the PUSCH transmission in the first slot (slot n). In addition, the UE multiplexes the HARQ-ACK information indicating the successful or unsuccessful reception of the fourth PDSCH (PDSCH4) with the PUSCH transmission in the second slot (slot n+1). The UE is unable to receive a PDCCH or a PDSCH corresponding to the HARQ-ACK information to be transmitted in each of the third slot (slot n+2) and the fourth slot (slot n+3). Accordingly, the UE does not multiplex HARQ-ACK information with PUSCH transmission in the third slot (slot n+2) and the fourth slot (slot n+3).

In the case where a PUSCH is repeatedly transmitted in one slot, the embodiments described above may be applied based on a repetition unit rather than a slot. The UE may not multiplex HARQ-ACK information with PUSCH transmission in a repetition unit in which the UE is not to transmit HARQ-ACK information together with a PUCCH if PUSCH transmission is absent. Specifically, the UE may determine whether or not to multiplex HARQ-ACK with PUSCH transmission in each of a plurality of repetition units. At this time, if the UE fails to receive a PDCCH corresponding to HARQ-ACK information to be transmitted in a specific repetition unit, the UE may not multiplex HARQ-ACK information with PUSCH transmission in the corresponding repetition unit. In the embodiments described above, if the UE multiplexes HARQ-ACK information with PUSCH transmission in any one of a plurality of repetition units, and if the UE fails to receive a PDCCH or a PDSCH corresponding to HARQ-ACK information to be transmitted in another repetition unit, the UE may not multiplex HARQ-ACK information with PUSCH transmission in the another repetition unit. The number of bits of the HARQ-ACK information multiplexed with the PUSCH transmission in each repetition unit may be determined according to the value of a UL-DAI field of a PDCCH for scheduling PUSCH transmission.

Figure 13:
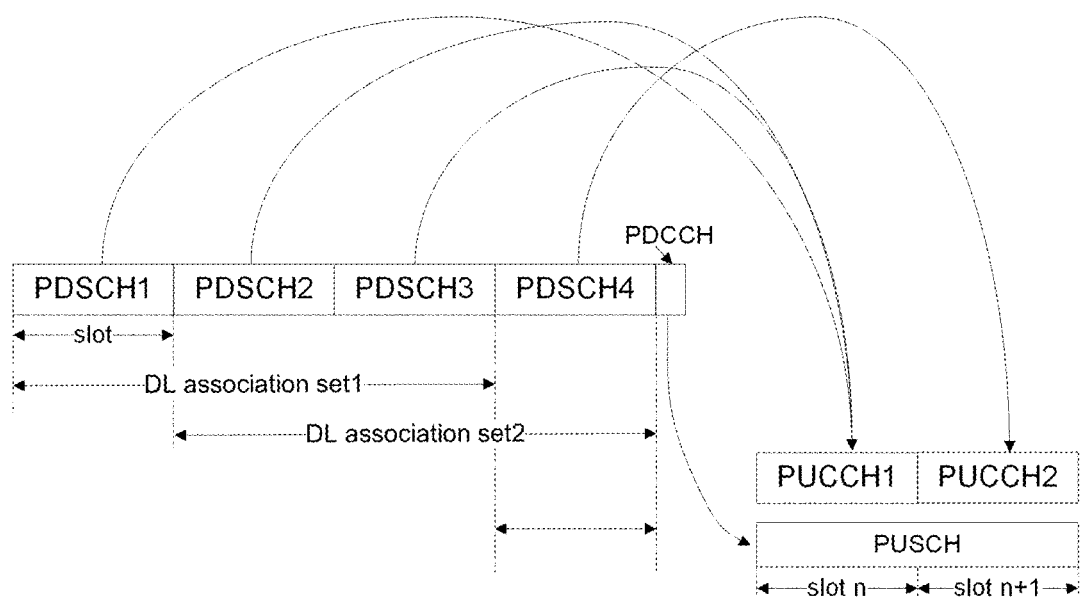
FIG. 13 illustrates an operation in which a user equipment multiplexes HARQ-ACK information with PUSCH transmission over a plurality of slots according to another embodiment of the present invention.

FIG. 13 illustrates an operation in which a UE multiplexes HARQ-ACK information with PUSCH transmission in a plurality of slots according to another embodiment of the present invention.

In another specific embodiment, the UE may determine whether or not to multiplex HARQ-ACK information with PUSCH transmission in all of a plurality of slots in which PUSCH transmission is performed. Specifically, the UE may determine to multiplex HARQ-ACK information with PUSCH transmission in all of a plurality of slots in which PUSCH transmission is performed, or may determine to not multiplex HARQ-ACK information with PUSCH transmission in all of a plurality of slots in which PUSCH transmission is performed. If a semi-static HARQ-ACK codebook is configured, and if the value of a UL-DAI field is 1, the UE may multiplex HARQ-ACK with PUSCH transmission in all of a plurality of slots in which PUSCH transmission is performed. In addition, if a semi-static HARQ-ACK codebook is configured, and if the value of a UL-DAI field is 0, the UE may not multiplex HARQ-ACK with PUSCH transmission in all of a plurality of slots in which PUSCH transmission is performed. In this embodiment, the HARQ-ACK information multiplexed with PUSCH transmission in the respective slots may indicate the successful or unsuccessful reception of different PDSCHs. If a semi-static HARQ-ACK codebook is configured, a set of PDSCHs corresponding to HARQ-ACK to be transmitted in one slot may be defined, and the same PDSCH may be included in the sets of PDSCHs corresponding to the HARQ-ACK to be transmitted in different slots. Specifically, the set of PDSCHs (referred to as a "DL association set"), of which the successful or unsuccessful reception is indicated by the respective pieces of HARQ-ACK information multiplexed with the PUSCH transmission in the respective slots, may be determined to be disjointed from each other. Here, determining the set of PDSCHs to be disjointed indicates that a first set of PDSCHs transmitted with HARQ-ACK in one slot and a second set of PDSCHs transmitted with HARQ-ACK in another slot do not include the same PDSCH. For example, the HARQ-ACK information multiplexed in a subsequent slot may not indicate the successful or unsuccessful reception of a PDSCH that is indicated as to the successful or unsuccessful reception thereof by the HARQ-ACK information multiplexed with the PUSCH transmission in a preceding slot. In this case, since the HARQ-ACK information multiplexed in the preceding slot is not redundantly multiplexed with the PUSCH transmission in the subsequent slot, UCI overhead on the PUSCH may be reduced.

In the embodiment shown in FIG. 13, PUSCH transmission is performed in the first slot (slot n) and the second slot (slot n+1). The PUSCH transmission overlaps PUCCH transmission with HARQ-ACK information in the first slot (slot n) and the second slot (slot n+1). The DL association set in the transmission of a first PUCCH (PUCCH1) overlapping PUSCH transmission in the first slot (slot n) includes a first PDSCH (PDSCH1) to a third PDSCH (PDSCH3). At this time, the DL association set is a set of PDSCHs of which the successful or unsuccessful reception is indicated by the HARQ-ACK information included in the PUCCH. The DL association set in the transmission of a second PUCCH (PUCCH2) overlapping PUSCH transmission in the second slot (slot n+1) includes a second PDSCH (PDSCH2) to a fourth PDSCH (PDSCH4). The UE multiplexes the HARQ-ACK information indicating the successful or unsuccessful reception of each of the first PDSCH (PDSCH1), the second PDSCH (PDSCH2), and the third PDSCH (PDSCH3) with the PUSCH transmission in the first slot (slot n). In addition, the UE multiplexes the HARQ-ACK information indicating the successful or unsuccessful reception of the fourth PDSCH (PDSCH4) with the PUSCH transmission in the second slot (slot n+1). This is due to the fact that the HARQ-ACK information indicating the successful or unsuccessful reception of the second PDSCH (PDSCH2) and the third PDSCH (PDSCH3) is multiplexed with the PUSCH transmission in the first slot (slot n).

In the case where a PUSCH is repeatedly transmitted in one slot, the embodiments described above may be applied based on a repetition unit rather than a slot. The UE may determine whether or not to multiplex HARQ-ACK information with PUSCH transmission in all of a plurality of repetition units. Specifically, the UE may determine to multiplex HARQ-ACK information with PUSCH transmission in all of a plurality of repetition units, or may determine to not multiplex HARQ-ACK information with PUSCH transmission in all of a plurality of repetition units. If a semi-static HARQ-ACK codebook is configured, and if the value of a UL-DAI field is 1, the UE may multiplex HARQ-ACK with PUSCH transmission in all of a plurality of repetition units. In addition, if a semi-static HARQ-ACK codebook is configured, and if the value of a UL-DAI field is 0, the UE may not multiplex HARQ-ACK with PUSCH transmission in all of a plurality of repetition units. In this embodiment, the HARQ-ACK information multiplexed with the PUSCH transmission in the respective slots may indicate the successful or unsuccessful reception of different PDSCHs. If a semi-static HARQ-ACK codebook is configured, a set of PDSCHs corresponding to HARQ-ACK transmitted in one slot may be defined, and the same PDSCH may be included in the sets of PDSCHs corresponding to HARQ-ACK transmitted in different slots. Specifically, the set of PDSCHs, of which the successful or unsuccessful reception is indicated by the respective pieces of HARQ-ACK information multiplexed with the PUSCH transmission in the respective repetition units, may be determined to be disjointed from each other. Here, determining the set of PDSCHs to be disjointed indicates that a first set of PDSCHs transmitted with HARQ-ACK in one slot and a second set of PDSCHs transmitted with HARQ-ACK in another slot do not include the same PDSCH. For example, the HARQ-ACK information multiplexed in a subsequent repetition unit may not indicate the successful or unsuccessful reception of a PDSCH that is indicated as to the successful or unsuccessful reception thereof by the HARQ-ACK information multiplexed with the PUSCH transmission in a preceding repetition unit.

Figure 14:
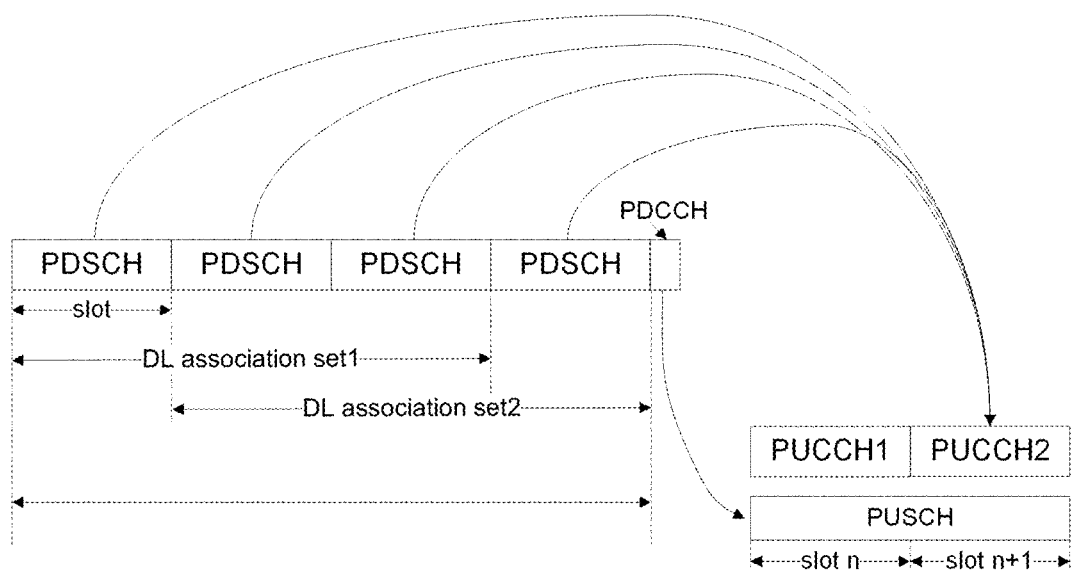
FIG. 14 illustrates an operation in which a user equipment multiplexes HARQ-ACK information with PUSCH transmission over a plurality of slots according to another embodiment of the present invention.
Figure 15:
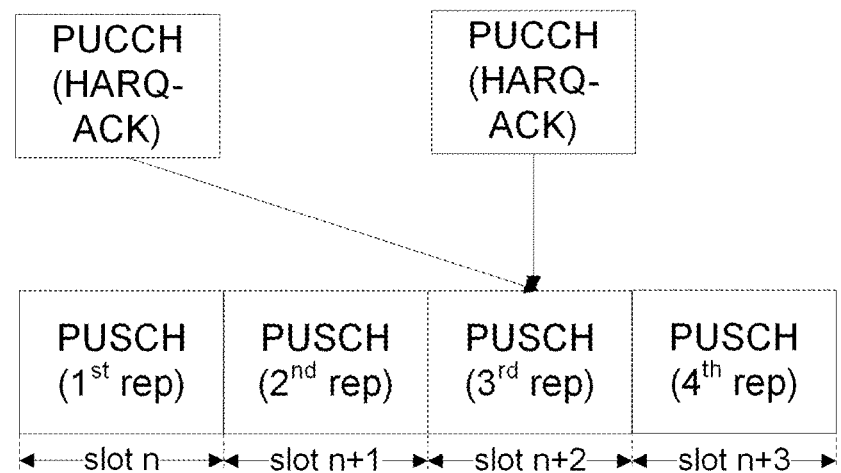
FIG. 15 illustrates an operation in which a user equipment multiplexes HARQ-ACK information with PUSCH transmission over a plurality of slots according to another embodiment of the present invention.

FIGS. 14 and 15 illustrate operations in which a UE multiplexes HARQ-ACK information with PUSCH transmission over a plurality of slots according to another embodiment of the present invention.

In another specific embodiment, if overlapping of PUCCH transmission with HARQ-ACK information occurs in at least one of a plurality of slots in which PUSCH transmission is performed, the UE may aggregate HARQ-ACK information of all PUCCH transmissions overlapping the PUSCH transmission. At this time, the UE may multiplex, with PUSCH transmission, the HARQ-ACK information aggregated in any of the plurality of slots in which PUSCH transmission is performed. Specifically, if the value of a UL-DAI field for scheduling PUSCH transmission is 1, the UE may aggregate HARQ-ACK information of all PUCCH transmissions overlapping PUSCH transmission, and may multiplex, with the PUSCH transmission, the HARQ-ACK information aggregated in any one of the plurality of slots in which PUSCH transmission is performed. In the embodiments above, any one slot may be the latest slot among the slots in which PUSCH transmission is performed. In another embodiment, any one slot may be the latest slot among the slots in which PUSCH transmission and PUCCH transmission with HARQ-ACK information overlap each other. In addition, any one slot may be the earliest slot among the slots in which PUSCH transmission is performed. In another embodiment, any one slot may be the earliest slot among the slots in which PUSCH transmission and PUCCH transmission with HARQ-ACK information overlap each other.

In the embodiment shown in FIG. 14, PUSCH transmission is performed in the first slot (slot n) and the second slot (slot n+1). The PUSCH transmission overlaps PUCCH transmission with HARQ-ACK information in the first slot (slot n) and the second slot (slot n+1). The DL association set in the transmission of a first PUCCH (PUCCH1) overlapping PUSCH transmission in the first slot (slot n) includes a first PDSCH (PDSCH1) to a third PDSCH (PDSCH3). The DL association set in the transmission of a second PUCCH (PUCCH2) overlapping PUSCH transmission in the second slot (slot n+1) includes a second PDSCH (PDSCH2) to a fourth PDSCH (PDSCH4). The UE multiplexes the HARQ-ACK information indicating the successful or unsuccessful reception of each of the first PDSCH (PDSCH1), the second PDSCH (PDSCH2), and the third PDSCH (PDSCH3) and the fourth PDSCH (PDSCH4) with PUSCH transmission in the second slot (slot n+1).

In the embodiment shown in FIG. 15, PUSCH transmission is performed in the first slot (slot n) to the fourth slot (slot n+3). Specifically, PUSCH transmission is repeatedly performed in every slot from the first slot (slot n) to the fourth slot (slot n+3). PUSCH transmission overlaps PUCCH transmission with HARQ-ACK information in the first slot (slot n) and the third slot (slot n+2). The UE aggregates PDSCHs corresponding to the HARQ-ACK information transmitted with a PUCCH transmitted in the first slot (slot n) and the HARQ-ACK information transmitted with a PUCCH transmitted in the third slot (slot n+2). The UE multiplexes the HARQ-ACK information of the aggregated PDSCHs with PUSCH transmission in the third slot (slot n+2), which is the latest slot among the slots in which PUSCH transmission and PUCCH transmission with HARQ-ACK information overlap.

In the case where a PUSCH is repeatedly transmitted in one slot, the embodiments described above may be applied based on a repetition unit rather than a slot. If overlapping of PUCCH transmission with HARQ-ACK information occurs in any one of a plurality of repetition units, the UE may aggregate PDSCHs of the HARQ-ACK information of all PUCCH transmissions overlapping PUSCH transmission. At this time, the UE may multiplex, with PUSCH transmission, the HARQ-ACK information of the aggregated PDSCHs in any one of the plurality of repetition units. Specifically, if the value of a UL-DAI field for scheduling PUSCH transmission is 1, the UE may aggregate PDSCHs corresponding to HARQ-ACK information of all PUCCH transmissions overlapping PUSCH transmission, and may multiplex, with PUSCH transmission, the HARQ-ACK information of the aggregated PDSCHs in any one of the plurality of repetition units. In the embodiments above, any one repetition unit may be the latest repetition unit among a plurality of repetition units. In another embodiment, any one repetition unit may be the latest repetition unit among a plurality of repetition units. In addition, in any one slot, any one repetition unit may be the earliest repetition unit among a plurality of repetition units. In another embodiment, in any one slot, any one repetition unit may be the earliest repetition unit among the plurality of repetition units.

In another specific embodiment, the UE may aggregate PDSCHs corresponding to the HARQ-ACK information of all PUCCH transmissions overlapping PUSCH transmission, and may repeatedly multiplex the HARQ-ACK information of the aggregated PDSCHs with PUSCH transmission for every slot in a plurality of slots in which PUSCH transmission is performed. Specifically, the UE may repeatedly transmit the HARQ-ACK information of the aggregated PDSCHs for every slot in all of the slots in which PUSCH transmission is performed. In another specific embodiment, the UE may repeatedly multiplex the HARQ-ACK information of the aggregated PDSCHs with PUSCH transmission in every slot in which overlapping of PUCCH transmission with HARQ-ACK information occurs among a plurality of slots in which PUSCH transmission is performed. In another specific embodiment, the UE may repeatedly multiplex the HARQ-ACK information of the aggregated PDSCHs with PUSCH transmission in every slot from the earliest slot, in which overlapping of PUCCH transmission with HARQ-ACK information occurs, to the latest slot, in which overlapping of PUCCH transmission with HARQ-ACK information occurs, among a plurality of slots in which PUSCH transmission is performed. In another specific embodiment, the UE may repeatedly multiplex the HARQ-ACK information of the aggregated PDSCHs with PUSCH transmission in every slot from the earliest slot, in which overlapping of PUCCH transmission with HARQ-ACK information occurs, to the latest slot, in which PUSCH transmission is performed, among a plurality of slots in which PUSCH transmission is performed. In another specific embodiment, the UE may repeatedly multiplex the HARQ-ACK information of the aggregated PDSCHs with PUSCH transmission in every slot from the latest slot, in which overlapping of PUCCH transmission with HARQ-ACK information occurs, to the latest slot, in which PUSCH transmission is performed, among a plurality of slots in which PUSCH transmission is performed.

In the case where a PUSCH is repeatedly transmitted in one slot, the embodiments described above may be applied based on a repetition unit rather than a slot. The UE may aggregate PDSCHs of HARQ-ACK information of all PUCCH transmissions overlapping PUSCH transmission, and may repeatedly multiplex the HARQ-ACK information of the aggregated PDSCHs with PUSCH transmission for every repetition unit in a plurality of repetition units. Specifically, the UE may repeatedly transmit the HARQ-ACK information of the aggregated PDSCHs for every repetition unit in all of the repetition units in which PUSCH transmission is performed. In another specific embodiment, the UE may repeatedly multiplex the HARQ-ACK information of the aggregated PDSCHs with PUSCH transmission in every repetition unit in which overlapping of PUCCH transmission with HARQ-ACK information occurs, among a plurality of repetition units. In another specific embodiment, the UE may repeatedly multiplex the HARQ-ACK information of the aggregated PDSCHs with PUSCH transmission in every repetition unit from the earliest repetition unit, in which overlapping of PUCCH transmission with HARQ-ACK information occurs, to the latest slot, in which overlapping of PUCCH transmission with HARQ-ACK information occurs, among a plurality of repetition units. In another specific embodiment, the UE may repeatedly multiplex the HARQ-ACK information of the aggregated PDSCHs with the PUSCH transmission in every repetition unit from the earliest repetition unit, in which overlapping of PUCCH transmission with HARQ-ACK information occurs, to the latest repetition unit, in which PUSCH transmission is performed, among a plurality of repetition units. In another specific embodiment, the UE may repeatedly multiplex the HARQ-ACK information of the aggregated PDSCHs with PUSCH transmission in every repetition unit from the latest repetition unit, in which overlapping of PUCCH transmission with HARQ-ACK information occurs, to the latest repetition unit, in which PUSCH transmission is performed, among a plurality of repetition units.

When the base station schedules PUSCH transmission over a plurality of slots, the base station may schedule PUSCH transmission or PUCCH transmission so that the number of slots in which the corresponding PUSCH transmission and the PUCCH transmission overlap each other is less than or equal to a specific number. When PUSCH transmission is performed over a plurality of slots, the UE may assume that corresponding PUSCH transmission and PUCCH transmission may overlap in a specific number of slots or less. That is, when PUSCH transmission is performed in a plurality of slots, the UE may assume that the corresponding PUSCH transmission and PUCCH transmission are unable to overlap in a number of slots exceeding a specific number. Here, the specific number may be 1. Specifically, if PUSCH transmission is performed in a plurality of slots, the UE may expect that the maximum number of slots in which the PUSCH transmission and PUCCH transmission overlap is 1. If a semi-static HARQ-ACK codebook is configured, the UE may determine that it indicates whether or not there is a PDSCH in which the value of a UL-DAI field of DCI for scheduling a PUSCH corresponds to one PUCCH transmission. In this embodiment, the slot in which PUSCH transmission and PUCCH transmission overlap may be the latest slot among the slots in which PUSCH transmission is performed. In another specific embodiment, the slot in which PUSCH transmission and PUCCH transmission with HARQ-ACK overlap may be the earliest (first) slot among the slots in which PUSCH transmission is performed. In another specific embodiment, the slot in which PUSCH transmission and PUCCH transmission with HARQ-ACK overlap may be the earliest slot among the slots in which PUSCH transmission and PUCCH transmission overlap. In another specific embodiment, the slot in which PUSCH transmission and PUCCH transmission with HARQ-ACK overlap may be the latest slot among the slots in which PUSCH transmission and PUCCH transmission overlap.

In the case where a PUSCH is repeatedly transmitted in one slot, the embodiments described above may be applied based on a repetition unit rather than a slot. The base station may schedule PUSCH transmission or PUCCH transmission so that the number of repetition units in which corresponding PUSCH transmission and PUCCH transmission overlap is less than or equal to a specific number. When PUSCH transmission is performed in a plurality of repetition units, the UE may assume that corresponding PUSCH transmission and PUCCH transmission may overlap in a specific number of repetition units or less. That is, when PUSCH transmission is performed in a plurality of repetition units, the UE may assume that corresponding PUSCH transmission and PUCCH transmission are unable to overlap in a number of repetition units exceeding a specific number. Here, the specific number may be 1. Specifically, if PUSCH transmission is performed in a plurality of repetition units, the UE may expect that the maximum number of repetition units in which PUSCH transmission and PUCCH transmission overlap is 1. If a semi-static HARQ-ACK codebook is configured, the UE may determine that the value of a UL-DAI field of DCI for scheduling a PUSCH indicates multiplexing of PUCCH transmission with one HARQ-ACK. In this embodiment, the repetition unit in which PUSCH transmission and PUCCH transmission overlap may be the latest repetition unit among the repetition units in which PUSCH transmission is performed. In another specific embodiment, the repetition unit in which PUSCH transmission and PUCCH transmission with HARQ-ACK overlap may be the earliest (first) repetition unit among the repetition units in which PUSCH transmission is performed. In another specific embodiment, the repetition unit in which PUSCH transmission and PUCCH transmission with HARQ-ACK overlap may be the earliest repetition unit among the repetition units in which PUSCH transmission and PUCCH transmission overlap. In another specific embodiment, the repetition unit in which PUSCH transmission and PUCCH transmission with HARQ-ACK overlap may be the latest repetition unit among the repetition units in which PUSCH transmission and PUCCH transmission overlap.

When PUSCH transmission is performed in a plurality of slots, the PUSCH transmission may be performed in a plurality of discontinuous slots. This is due to the fact that the PUSCH transmission is able to be performed only in the symbol that is configured as a flexible symbol or a UL symbol through an RRC signal. Specifically, the UE may perform PUSCH transmission in the symbol configured as a DL symbol through an RRC signal. Accordingly, if any one of the symbols in which the PUSCH is scheduled is configured as a DL symbol by an RRC signal in a specific slot, the UE is unable to transmit the PUSCH in the corresponding slot. The RRC signal configuring the symbol as a UL symbol, a flexible symbol, or a DL symbol may be at least one of tdd-UL-DL-CnofigurationCommon and tdd-UL-DL-ConfigurationDedicated. If PUSCH transmission is performed in a plurality of discontinuous slots, the maximum number of slots in which PUSCH transmission and PUCCH transmission overlap may be determined based on the number of consecutive slots. Specifically, consecutive slots among the slots in which PUSCH transmission and PUCCH transmission overlap are counted as one. In addition, if the slots are not consecutive, other consecutive slots are counted. A slot chunk indicates a set of consecutive slots in which PUSCH transmission is performed. For example, PUSCH transmission may be performed in the first slot (slot n), the second slot (slot n+1), and the fourth slot (slot n+3), whereas PUSCH transmission is unable to be performed in the third slot (slot n+2) because it overlaps one or more DL symbols. In this case, the number of slot chunks is 2. At this time, the UE may aggregate PDSCHs corresponding to HARQ-ACK information together with PUCCH transmission overlapping PUSCH transmission, and may multiplex the HARQ-ACK information of the aggregated PDSCHs with PUSCH transmission in the latest slot chunk.

According to the embodiments described above, a method in which the UE applies the value of a UL-DAI field to the multiplexing of HARQ-ACK information when multiplexing HARQ-ACK information with PUSCH transmission in a plurality of slots will be described. The UE may determine whether or not to multiplex HARQ-ACK information with PUSCH transmission by applying the value of a UL-DAI field of DCI for scheduling corresponding PUSCH transmission to every slot in which HARQ-ACK information is multiplexed with PUSCH transmission. Specifically, the UE may determine whether or not to perform multiplexing of HARQ-ACK information and the number of bits of HARQ-ACK information according to the value of a UL-DAI field in every slot in which HARQ-ACK information is multiplexed with PUSCH transmission. For example, PUSCH transmission may be performed in 4 slots, and the UE may determine whether or not to multiplex HARQ-ACK information with PUSCH transmission in 4 slots. At this time, the UE may determine whether or not to multiplex HARQ-ACK information and the number of bits of HARQ-ACK information to be multiplexed in each of the 4 slots on the basis of the value of a UL-DAI field. The number of PDSCHs of which the successful or unsuccessful reception is indicated by the HARQ-ACK information multiplexed with PUSCH transmission in the first slot is N1, the number of PDSCHs of which the successful or unsuccessful reception is indicated by the HARQ-ACK information multiplexed with PUSCH transmission in the second slot is N2, the number of PDSCHs of which the successful or unsuccessful reception is indicated by the HARQ-ACK information multiplexed with PUSCH transmission in the third slot is N3, and the number of PDSCHs of which the successful or unsuccessful reception is indicated by the HARQ-ACK information multiplexed with PUSCH transmission in the fourth slot is N4. At this time, the UE may assume that the remainder obtained by dividing each of N1, N2, N3, and N4 by 4 is the value indicated by the value of a UL-DAI field. For example, if the value of a UL-DAI field indicates 0 ($00_b$), the UE may determine that the remainder obtained by dividing the number of PDSCHs corresponding to the HARQ-ACK multiplexed in each of the first slot, the second slot, the third slot, and the fourth slot by 4 is 1 (i.e., the number of PDSCHs corresponding to the HARQ-ACK is any one of 1, 5, 9, . . . ). If the value of a UL-DAI field indicates 1 ($01_b$), the UE may determine that the remainder obtained by dividing the number of PDSCHs corresponding to the HARQ-ACK multiplexed in each of the first slot, the second slot, the third slot, and the fourth slot by 4 is 2 (i.e., the number of PDSCHs corresponding to the HARQ-ACK is any one of 2, 6, 10, . . . ). If the value of a UL-DAI field indicates 2 ($10_b$), the UE may determine that the remainder obtained by dividing the number of PDSCHs corresponding to the HARQ-ACK multiplexed in each of the first slot, the second slot, the third slot, and the fourth slot by 4 is 3 (i.e., the number of PDSCHs corresponding to the HARQ-ACK is any one of 3, 7, 11, . . . ). If the value of a UL-DAI field indicates 3 ($11_b$), the UE may determine that the remainder obtained by dividing the number of PDSCHs corresponding to the HARQ-ACK multiplexed in each of the first slot, the second slot, the third slot, and the fourth slot by 4 is 0 (i.e., the number of PDSCHs corresponding to the HARQ-ACK is any one of 0, 4, 8, . . . ). The number of PDSCHs corresponding to the HARQ-ACK multiplexed may differ between the slots. In addition, as shown in the embodiment described with reference to FIG. 13, the UE may determine whether or not to multiplex HARQ-ACK information with PUSCH transmission in all of a plurality of slots in which PUSCH transmission is performed. Even in this case, the UE may multiplex HARQ-ACK information with PUSCH transmission by applying the value of a UL-DAI field to every slot in which HARQ-ACK information is multiplexed with PUSCH transmission. Specifically, even if there is no PDSCH corresponding to HARQ-ACK information of PUCCH transmission in a specific slot, the UE may multiplex HARQ-ACK information with PUSCH transmission in the corresponding slot.

In the case where a PUSCH is repeatedly transmitted in one slot, the embodiments described above may be applied based on a repetition unit rather than a slot. The UE may determine whether or not to multiplex HARQ-ACK information with PUSCH transmission by applying the value of a UL-DAI field of DCI for scheduling corresponding PUSCH transmission to every repetition unit in which HARQ-ACK information is multiplexed with PUSCH transmission. Specifically, the UE may determine whether or not to perform multiplexing of HARQ-ACK information and the number of bits of HARQ-ACK information according to the value of a UL-DAI field in every repetition unit in which HARQ-ACK information is multiplexed with PUSCH transmission. For example, PUSCH transmission may be performed in 4 repetition units, and the UE may determine whether or not to multiplex HARQ-ACK information with PUSCH transmission in 4 repetition units. At this time, the UE may determine whether or not to perform multiplexing of HARQ-ACK information and the number of bits of HARQ-ACK information to be multiplexed in each of the 4 repetition units on the basis of the value of a UL-DAI field. The number of PDSCHs of which the successful or unsuccessful reception is indicated by the HARQ-ACK information multiplexed with PUSCH transmission in the first repetition unit is N1, the number of PDSCHs of which the successful or unsuccessful reception is indicated by the HARQ-ACK information multiplexed with PUSCH transmission in the second repetition unit is N2, the number of PDSCHs of which the successful or unsuccessful reception is indicated by the HARQ-ACK information multiplexed with PUSCH transmission in the third repetition unit is N3, and the number of PDSCHs of which the successful or unsuccessful reception is indicated by the HARQ-ACK information multiplexed with PUSCH transmission in the fourth repetition unit is N4. At this time, the UE may assume that the remainder obtained by dividing each of N1, N2, N3, and N4 by 4 is the value indicated by the value of a UL-DAI field. For example, if the value of a UL-DAI field indicates 0 ($00_b$), the UE may determine that the remainder obtained by dividing the number of PDSCHs corresponding to the HARQ-ACK multiplexed in the first repetition unit, the second repetition unit, the third repetition unit, and the fourth repetition unit by 4 is 1 (i.e., the number of PDSCHs corresponding to the HARQ-ACK is any one of 1, 5, 9, . . . ). If the value of a UL-DAI field indicates 1 ($01_b$), the UE may determine that the remainder obtained by dividing the number of PDSCHs corresponding to the HARQ-ACK multiplexed in each of the first repetition unit, the second repetition unit, the third repetition unit, and the fourth repetition unit by 4 is 2 (i.e., the number of PDSCHs corresponding to the HARQ-ACK is any one of 2, 6, 10, . . . ). If the value of a UL-DAI field indicates 2 ($10_b$), the UE may determine that the remainder obtained by dividing the number of PDSCHs corresponding to the HARQ-ACK multiplexed in the first repetition unit, the second repetition unit, the third repetition unit, and the fourth repetition unit by 4 is 3 (i.e., the number of PDSCHs corresponding to the HARQ-ACK is any one of 3, 7, 11, . . . ). If the value of a UL-DAI field indicates 3 ($11_b$), the UE may determine that the remainder obtained by dividing the number of PDSCHs corresponding to the HARQ-ACK multiplexed in the first repetition unit, the second repetition unit, the third repetition unit, and the fourth repetition unit by 4 is 0 (i.e., the number of PDSCHs corresponding to the HARQ-ACK is any one of 0, 4, 8, . . . ). The number of PDSCHs corresponding to the HARQ-ACK multiplexed in each repetition unit may differ.

In addition, as shown in the embodiment described with reference to FIG. 13, the UE may determine whether or not to multiplex HARQ-ACK information with PUSCH transmission in all of a plurality of repetition units in which PUSCH transmission is performed. Even in this case, the UE may multiplex HARQ-ACK information with PUSCH transmission by applying the value of a UL-DAI field to every repetition unit in which HARQ-ACK information is multiplexed with PUSCH transmission. Specifically, even if there is no PDSCH corresponding to HARQ-ACK information of PUCCH transmission in a specific repetition unit, the UE may multiplex HARQ-ACK information with PUSCH transmission in the corresponding repetition unit.

In the embodiment described above, the number of PDSCHs corresponding to each of a plurality of PUCCH transmissions overlapping the PUSCH transmission may differ. For example, PUSCH transmission may overlap PUCCH transmission in two slots. At this time, there may be 8 PDSCHs corresponding to HARQ-ACK information of a first PUCCH transmission overlapping the PUSCH transmission in the first slot, and there may be 5 PDSCHs corresponding to HARQ-ACK information of a second PUCCH transmission overlapping the PUSCH repetition transmission in the second slot. If the value of a UL-DAI field of DCI for scheduling PUSCH transmission indicates 4 (i.e., $11_b$), the UE may determine that there are 8 PDSCHs corresponding to the first PUCCH and that there are 8 PDSCHs corresponding to the second PUCCH. In addition, the UE may fail to receive DCI for scheduling a PDSCH corresponding to the HARQ-ACK information of the second PUCCH transmission overlapping the PUSCH repetition transmission in the second slot. In this case, the UE may determine that the number of PDSCHs corresponding to the second PUCCH is 4, which is less than 8. Accordingly, confusion may arise as to the number of PDSCHs of which the successful or unsuccessful reception is indicated by the HARQ-ACK information multiplexed with the PUSCH transmission between the UE and the base station. Therefore, the UE may configure the number of PDSCHs corresponding to HARQ-ACK information of the slot having the largest number of PDSCHs corresponding to the HARQ-ACK information, among the HARQ-ACK information of the PUCCHs overlapping PUSCH transmission in a plurality of slots, as the number of bits of all pieces of HARQ-ACK information multiplexed with PUSCH transmission. The UE may configure the number of bits equal to that of the HARQ-ACK information of the slot having the largest number of bits of HARQ-ACK information, among the HARQ-ACK information of the PUCCHs overlapping PUSCH transmission in a plurality of slots, as the number of bits of the HARQ-ACK information multiplexed with each PUSCH transmission. In these embodiments, the UE may configure the bit of the HARQ-ACK information, in which the DCI scheduling the reception of a corresponding PDSCH is not received, as NACK. In these embodiments, since the base station is aware of the number of PDSCH transmissions scheduled by the base station, the base station may estimate the number of bits of the HARQ-ACK information corresponding to the successful or unsuccessful reception of the PDSCH transmission in each slot. Accordingly, these embodiments make it possible to prevent confusion regarding the number of PDSCHs of which the successful or unsuccessful reception is indicated by the HARQ-ACK information multiplexed with the PUSCH transmission between the UE and the base station.

In the case where a PUSCH is repeatedly transmitted in one slot, the embodiments described above may be applied based on a repetition unit rather than a slot. The UE may configure the number of PDSCHs corresponding to HARQ-ACK information of the repetition unit having the largest number of PDSCHs corresponding to the HARQ-ACK information, among the HARQ-ACK information of the PUCCHs overlapping the PUSCH transmission in a plurality of repetition units, as the number of bits of all pieces of HARQ-ACK information multiplexed with the PUSCH transmission. The UE may configure the number of bits equal to that of the HARQ-ACK information of the repetition unit having the largest number of bits of HARQ-ACK information, among the HARQ-ACK information of the PUCCHs overlapping the PUSCH transmission in a plurality of repetition units, as the number of bits of the HARQ-ACK information multiplexed with each PUSCH transmission. In these embodiments, the UE may configure the bit of the HARQ-ACK information, in which the DCI scheduling the reception of a corresponding PDSCH is not received, as NACK.

In another specific embodiment, the UE may determine the value of a 2-bit UL-DAI field to be information on the HARQ-ACK information of all PUCCH transmissions overlapping PUSCH transmission. Specifically, the UE may determine that the value of a 2-bit UL-DAI field indicates the remainder obtained by dividing the sum of the numbers of PDSCHs corresponding to the HARQ-ACK information of all PUCCH transmissions overlapping PUSCH transmission by 4. For example, PUSCH transmission is performed in 4 slots, and the numbers of PDSCHs corresponding to the HARQ-ACK information (or the number of bits of HARQ-ACK) of 4 PUCCH transmissions overlapping the PUSCH transmission in the 4 slots are N1, N2, N3, and N4, respectively. At this time, the UE may determine that the value of a UL-DAI field of DCI for scheduling PUSCH transmission indicates the value obtained by dividing N1+N2+N3+N4 by 4. If the value of a UL-DAI field is 4 (i.e., $11_b$), the UE may determine that the remainder obtained by dividing N1+N2+N3+N4 by 4 is 0. Accordingly, the UE may multiplex, with the PUSCH transmission, the HARQ-ACK information indicating the successful or unsuccessful reception of a number of PDSCHs corresponding to a multiple of 4.

In another specific embodiment, PUSCH transmission is performed in 4 repetition units, and the numbers of PDSCHs corresponding to HARQ-ACK information (or the number of bits of HARQ-ACK) of 4 PUCCH transmissions overlapping the PUSCH transmission in the 4 repetition units are N1, N2, N3, and N4, respectively. At this time, the UE may determine that the value of a UL-DAI field of DCI for scheduling PUSCH transmission indicates the value obtained by dividing N1+N2+N3+N4 by 4. If the value of a UL-DAI field is 0 (i.e., $00_b$), the UE may determine that the remainder obtained by dividing N1+N2+N3+N4 by 4 is 1. If the value of a UL-DAI field is 1 (i.e., $01_b$), the UE may determine that the remainder obtained by dividing N1+N2+N3+N4 by 2 is 0. If the value of a UL-DAI field is 2 (i.e., $10_b$), the UE may determine that the remainder obtained by dividing N1+N2+N3+N4 by 4 is 3. If the value of a UL-DAI field is 3 (i.e., $11_b$), the UE may determine that the remainder obtained by dividing N1+N2+N3+N4 by 4 is 0. Accordingly, the UE may multiplex, with PUSCH transmission, the HARQ-ACK information indicating the successful or unsuccessful reception of a number of PDSCHs corresponding to a multiple of 4. As described above, when the base station schedules PUSCH transmission in a plurality of slots, the base station may schedule PUSCH transmission or PUCCH transmission so that the number of slots in which the corresponding PUSCH transmission and the PUCCH transmission overlap is less than or equal to a specific number. When PUSCH transmission is performed in a plurality of slots, the UE may assume that the corresponding PUSCH transmission and the PUCCH transmission may overlap in a specific number of slots or less. Here, the specific number may be 1. In this embodiment, the UE may determine that the value of a UL-DAI field of DCI for scheduling the PUSCH transmission indicates information on the number of bits of the HARQ-ACK information involved in PUCCH transmission in one slot in which PUSCH transmission and PUCCH transmission overlap. Specifically, the UE may determine that the value of a UL-DAI field of DCI for scheduling PUSCH transmission indicates the remainder obtained by dividing the number of bits of HARQ-ACK information involved in PUCCH transmission by 4 in one slot in which PUSCH transmission and PUCCH transmission overlap. In the case where a PUSCH is repeatedly transmitted in one slot, the base station may schedule PUSCH transmission or PUCCH transmission such that the number of repetition units in which the corresponding PUSCH transmission and the PUCCH transmission overlap is less than or equal to a specific number. At this time, the UE may assume that the corresponding PUSCH transmission and the PUCCH transmission may overlap in a specific number of repetition units or less. Here, the specific number may be 1. In this embodiment, the UE may determine that the value of a UL-DAI field of DCI for scheduling PUSCH transmission indicates information on the number of bits of HARQ-ACK information involved in PUCCH transmission in one repetition unit in which the PUSCH transmission and the PUCCH transmission overlap. Specifically, the UE may determine that the value of a UL-DAI field of DCI for scheduling PUSCH transmission indicates the remainder obtained by dividing the number of bits of HARQ-ACK information involved in PUCCH transmission by 4 in one repetition unit in which the PUSCH transmission and the PUCCH transmission overlap.

In another specific embodiment, if PUSCH transmission is performed in a plurality of slots, and if a HARQ-ACK codebook is configured, the number of bits of a UL-DAI field may be determined according to the number of slots in which PUSCH transmission is performed. Specifically, the number of bits of a UL-DAI field may be proportional to the number of slots in which PUSCH transmission is performed. In a specific embodiment, if a dynamic HARQ-ACK codebook is configured, the number of bits of a UL-DAI field may be the value obtained by multiplying the number of slots, in which PUSCH transmission is performed, by 2. At this time, each of 2-bit subfields of the UL-DAI field may indicate the remainder obtained by dividing the number of bits of the HARQ-ACK information multiplexed with PUSCH transmission by 4 in each slot in which PUSCH transmission is performed. For example, if PUSCH transmission is configured to be performed in 4 slots, and if a dynamic HARQ-ACK codebook is configured, the number of bits of a UL-DAI field may be 8. At this time, each of 2-bit subfields of the UL-DAI field may indicate HARQ-ACK information multiplexed with PUSCH transmission in each of the 4 slots in which PUSCH transmission is performed. In a specific embodiment, if a semi-static HARQ-ACK codebook is configured, the number of bits of a UL-DAI field may be the same as the number of slots in which PUSCH transmission is performed. At this time, each bit of the UL-DAI field may indicate whether or not HARQ-ACK information is multiplexed with PUSCH transmission in each slot in which PUSCH transmission is performed. For example, if PUSCH transmission is configured to be performed in 4 slots, and if a semi-static HARQ-ACK codebook is configured, the number of bits of a UL-DAI field may be 4. At this time, each bit of the UL-DAI field may indicate whether or not HARQ-ACK information is multiplexed with PUSCH transmission in each of the 4 slots in which PUSCH transmission is performed.

In addition, if a PUSCH is repeatedly transmitted in one slot, the number of bits of a UL-DAI field may be determined according to the number of repetition units in which PUSCH transmission is performed. Specifically, the number of bits of a UL-DAI field may be proportional to the number of repetition units in which PUSCH transmission is performed. In a specific embodiment, if a dynamic HARQ-ACK codebook is configured, the number of bits of a UL-DAI field may be the value obtained by multiplying the number of repetition units, in which PUSCH transmission is performed, by 2. At this time, each of 2-bit subfields of the UL-DAI field may indicate the remainder obtained by dividing the number of bits of the HARQ-ACK information multiplexed with PUSCH transmission by 4 in each repetition unit in which PUSCH transmission is performed. For example, if PUSCH transmission is configured to be performed in 4 repetition units, and if a dynamic HARQ-ACK codebook is configured, the number of bits of a UL-DAI field may be 8. At this time, each of 2-bit subfields of the UL-DAI field may indicate the HARQ-ACK information multiplexed with PUSCH transmission in each of the 4 repetition units in which PUSCH transmission is performed. In a specific embodiment, if a semi-static HARQ-ACK codebook is configured, the number of bits of a UL-DAI field may be the same as the number of repetition units in which PUSCH transmission is performed. At this time, each bit of the UL-DAI field may indicate whether or not HARQ-ACK information is multiplexed with PUSCH transmission in each repetition unit in which PUSCH transmission is performed. For example, if PUSCH transmission is configured to be performed in 4 repetition units, and if a semi-static HARQ-ACK codebook is configured, the number of bits of a UL-DAI field may be 4. At this time, each bit of the UL-DAI field may indicate whether or not HARQ-ACK information is multiplexed with PUSCH transmission in each of the 4 repetition units in which PUSCH transmission is performed. In the above embodiments, it has been described that the UE multiplexes HARQ-ACK information with PUSCH transmission in a plurality of slots. The above-described embodiment may be applied to the case where the UE multiplexes UCI (uplink control information) with PUSCH transmission. UCI may include CSI/SR. The UE may perform multiplexing of UCI in at least one of a plurality of slots in which PUSCH transmission is performed. When the UE multiplexes UCI with PUSCH transmission in a plurality of slots, the UE may configure the numbers of bits of UCI to be the same. Specifically, when the UE multiplexes UCI with PUSCH transmission in a plurality of slots, the UE may configure the number of bits of all pieces of UCI multiplexed with PUSCH transmission as the maximum number of bits of UCI, among the UCI multiplexed with PUSCH transmission. At this time, the UE may pad 0 to the UCI, thereby configuring the number of bits of all pieces of UCI multiplexed with PUSCH transmission as the maximum number of bits of UCI, among the UCI multiplexed with PUSCH transmission. Specifically, the UE may add a bit indicating NACK to the HARQ-ACK information of UCI, thereby configuring the number of bits of the UCI multiplexed with PUSCH transmission as the maximum number of bits of UCI, among the UCI multiplexed with PUSCH transmission. In addition, if a PUSCH is repeatedly transmitted in one slot, the UE may perform multiplexing of UCI in at least one of a plurality of repetition units in which PUSCH transmission is performed. When the UE multiplexes UCI with PUSCH transmission in a plurality of repetition units, the UE may determine the numbers of bits of UCI to be the same. Specifically, when the UE multiplexes UCI with PUSCH transmission in a plurality of repetition units, the UE may configure the number of bits of all pieces of UCI multiplexed with PUSCH transmission as the maximum number of bits of UCI, among the UCI multiplexed with PUSCH transmission. At this time, the UE may pad 0 to the UCI, thereby configuring the number of bits of all pieces of UCI multiplexed with PUSCH transmission as the maximum number of bits of UCI, among the UCI multiplexed with PUSCH transmission. Specifically, the UE may add a bit indicating NACK to the HARQ-ACK information of UCI, thereby configuring the number of bits of the UCI multiplexed with PUSCH transmission as the maximum number of bits of UCI, among the UCI multiplexed with the PUSCH transmission.

When the UE multiplexes UCI with PUSCH transmission in a plurality of slots, the UE may dispose the UCI to the RE at the same position (or in the same pattern) in all of the slots in which the UCI is multiplexed, thereby multiplexing the same.

Specifically, the UE may transmit UCI in the RE corresponding to the union of sets of REs corresponding to all pieces of UCI multiplexed with PUSCH transmission, and may transmit a PUSCH in the remaining REs.

In some of the embodiments described above, the UE may multiplex HARQ-ACK information with PUSCH transmission in the slot in which the PUCCH including HARQ-ACK information would not be transmitted if the PUSCH transmission were absent. At this time, the UE may multiplex HARQ-ACK information including only NACK with PUSCH transmission in the slot in which the PUCCH with HARQ-ACK information would not be transmitted if the PUSCH transmission were absent. Specifically, the UE may multiplex valid HARQ-ACK information with PUSCH transmission in the slot that satisfies a PDSCH processing time. At this time, the UE may multiplex HARQ-ACK information, in which successful or unsuccessful reception of a corresponding PDSCH is configured as NACK, with the PUSCH transmission in the slot that does not satisfy the PDSCH processing time.

In addition, the UE may multiplex valid HARQ-ACK information with PUSCH transmission in the slot indicated by the value of a PDSCH-to-HARQ_feedback timing indicator field of DCI for scheduling a PDSCH. At this time, the UE may multiplex HARQ-ACK information, in which the successful or unsuccessful reception of a corresponding PDSCH is configured as NACK, with PUSCH transmission in the slots other than the slot indicated by the value of a PDSCH-to-HARQ_feedback timing indicator field of DCI for scheduling a PDSCH. In another specific embodiment, the UE may multiplex valid HARQ-ACK information with PUSCH transmission in the slot indicated by the value of a PDSCH-to-HARQ_feedback timing indicator field of DCI for scheduling a PDSCH and in the slots subsequent thereto. At this time, the UE may multiplex HARQ-ACK information, in which the successful or unsuccessful reception of a corresponding PDSCH is configured as NACK, with PUSCH transmission in the slots before the slot indicated by the value of a PDSCH-to-HARQ_feedback timing indicator field of DCI for scheduling a PDSCH.

In the embodiment described with reference to FIG. 12, if a PDCCH or a PDSCH satisfying the HARQ-ACK timing is not received for a specific slot, the UE does not multiplex HARQ-ACK information with PUSCH transmission in the corresponding slot. In another specific embodiment, the UE may multiplex HARQ-ACK information with PUSCH transmission in the slot indicated by a PDSCH-to-HARQ_feedback timing indicator field of DCI for scheduling a PDSCH. At this time, the UE may multiplex HARQ-ACK information, in which the successful or unsuccessful reception of a corresponding PDSCH is configured as NACK, with PUSCH transmission in the slot other than the slot indicated by DCI for scheduling the PDSCH using the value of a PDSCH-to-HARQ_feedback timing indicator.

In the embodiment described with reference to FIG. 13, the HARQ-ACK information multiplexed with PUSCH transmission in a subsequent slot does not indicate the successful or unsuccessful reception of a PDSCH of which the successful or unsuccessful reception is indicated by the HARQ-ACK information multiplexed with PUSCH transmission in a previous slot. In another specific embodiment, the HARQ-ACK information multiplexed with PUSCH transmission in a subsequent slot may indicate the successful or unsuccessful reception of the PDSCH, of which the successful or unsuccessful reception is indicated by the HARQ-ACK information multiplexed with PUSCH transmission in a previous slot, using NACK.

In addition, when the UE calculates the number of bits of HARQ-ACK information in order to determine whether or not multiplexing is required, the UE may exclude the HARQ-ACK information configured as NACK from the calculation of the number of bits of HARQ-ACK regardless of the successful or unsuccessful reception of a PDSCH as shown in the embodiments described above. For example, if the total number of bits of HARQ-ACK information multiplexed with PUSCH transmission by the UE is A, and if the number of bits configured as NACK regardless of the successful or unsuccessful reception of a PDSCH is B, the UE may determine the number of bits of valid HARQ-ACK information to be multiplexed with PUSCH transmission on the basis of A-B. The UE may determine the amount of resources to be multiplexed with PUSCH transmission using the number of bits of valid HARQ-ACK information. The amount of resources to be multiplexed may indicate the number of REs for transmitting HARQ-ACK information. The amount of resources to be multiplexed may increase in proportion to the value of A-B. More specifically, if a target code rate for transmission of HARQ-ACK information is configured as "a", the number of REs transmitting HARQ-ACK information may be (A-B)/(Modulation_order*a). Here, "Modulation_order" represents the modulation order of HARQ-ACK information multiplexed with the PUSCH. For example, if A-B is 0, since there is no valid HARQ-ACK information, the UE may not multiplex HARQ-ACK information with PUSCH transmission.

As described above, if PUCCH transmission with HARQ-ACK information overlaps PUSCH transmission in the time domain, the UE may multiplex HARQ-ACK information with PUSCH transmission. In addition, if PUCCH transmission with HARQ-ACK information overlaps another PUCCH transmission in the time domain, the UE may multiplex HARQ-ACK information with another PUCCH transmission. When the UE multiplexes HARQ-ACK information with PUSCH transmission or another PUCCH transmission in any one slot, if processing timing conditions for a PDSCH of which the successful or unsuccessful reception is indicated by HARQ-ACK and a PDCCH for scheduling PUCCH transmission including HARQ-ACK are satisfied, the UE may perform multiplexing. This will be described with reference to FIGS. 16 to 18.

Figure 16:
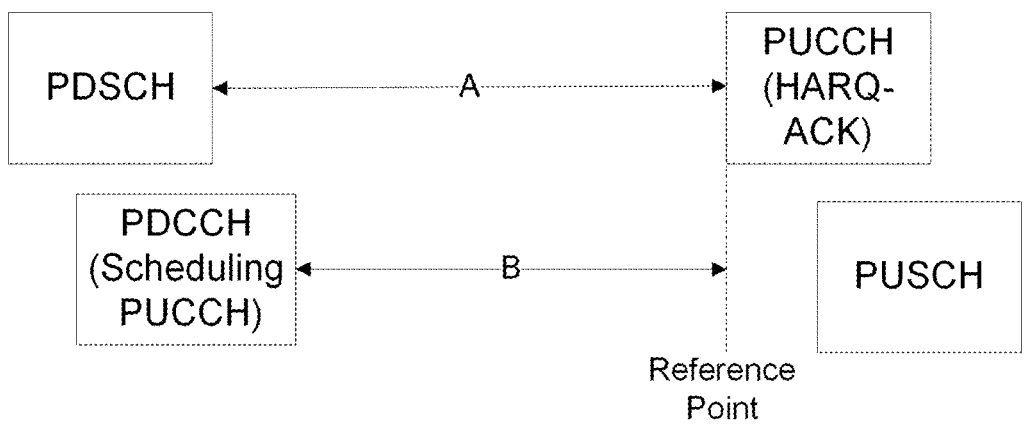
FIG. 16 illustrates a method in which a user equipment determines whether or not multiplexing of HARQ-ACK information is enabled on the basis of the latest symbol of a PDSCH of which the successful or unsuccessful reception is indicated by HARQ-ACK information and the latest symbol of a PDCCH for scheduling a PUCCH including HARQ-ACK information when multiplexing HARQ-ACK information with PUSCH transmission according to an embodiment of the present invention.

FIG. 16 illustrates a method in which a UE determines whether or not multiplexing of HARQ-ACK information is enabled on the basis of the latest symbol of a PDSCH of which the successful or unsuccessful reception is indicated by HARQ-ACK information and the latest symbol of a PDCCH for scheduling a PUCCH including HARQ-ACK information when multiplexing HARQ-ACK information with PUSCH transmission according to an embodiment of the present invention.

The UE may multiplex HARQ-ACK information with physical channel transmission on the basis of the position of the latest symbol of a PDSCH of which the successful or unsuccessful reception is indicated by HARQ-ACK information and the position of the earlier symbol of the start symbol of a PUCCH including HARQ-ACK information and the start symbol of physical channel transmission used in multiplexing of HARQ-ACK information. If the earlier symbol of the first symbol of a PUCCH including HARQ-ACK information and the first symbol of another PUCCH is positioned behind the latest symbol of a PDSCH, of which the successful or unsuccessful reception is indicated by HARQ-ACK information, by $N_1^+ + d_{1,1} + d_{1,2}$ symbols or more, the UE may transmit HARQ-ACK information through the PUCCH. If the earlier symbol of the first symbol of a PUCCH including HARQ-ACK information and the first symbol of a PUSCH is positioned behind the latest symbol of a PDSCH, of which the successful or unsuccessful reception is indicated by HARQ-ACK information, by $N_1^+ + d_{1,1} + d_{1,2}$ symbols or more, the UE may transmit HARQ-ACK information through the PUSCH. At this time, $N_1^+$ is $N_1 + 1$. The value $N_1$ follows Table 4.

TABLE 4

| | PDSCH decoding time $N_1$ [symbols] | |
|---|---|---|
| $\mu$ | dmrs-AdditionalPosition = pos0 in DMRS-DownlinkConfig in either of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB |
| 0 | 8 | 13 |
| 1 | 10 | 13 |
| 2 | 17 | 20 |
| 3 | 20 | 24 |

In Table 4, "$\mu$" is one of the subcarrier spacing values of a PDCCH or the subcarrier spacing values of a UL BWP through which HARQ-ACK information is transmitted, and may be the value that maximizes $T_{proc,1}$. $T_{proc,1}$ may indicate the minimum time required for the UE to receive a PDSCH and produce valid HARQ-ACK for the corresponding PDSCH. Specifically, $T_{proc,1}$ may be determined according to the following equation.

$$T_{proc,1}=((N_1+d_{1,1}+d_{1,2})(2048+144)\cdot\kappa 2^\mu)\cdot T_c$$

In addition, $d_{1,1}$ is 0 if HARQ-ACK information is transmitted through a PUCCH, and is 1 if HARQ-ACK information is transmitted through a PUSCH. With regard to $d_{1,2}$, if the PDSCH mapping type is A, and if the latest symbol of a PDSCH is the $i^{th}$ symbol before the $7^{th}$ symbol, it may be $d_{1,2}=7-i$. If the PDSCH mapping type is B, and if the length of a PDSCH is 4 symbols, it may be $d_{1,2}=3$. If the length of a PDSCH is 2 symbols, it may be $d_{1,2}=3+d$. At this time, "d" is the number of symbols in which the PDSCH, the PDSCH, and PDCCH overlap. The mapping type of a PDSCH may be indicated by DCI. The position of a first DMRS of a PDSCH may be determined according to the mapping type of the PDSCH.

Specifically, if the mapping type of a PDSCH is A, the position of a first DMRS of the PDSCH is fixed in a slot. In addition, if the mapping of a PDSCH is B, a first DMRS of the PDSCH starts at the first symbol of a scheduled PDSCH.

The UE may multiplex a HARQ-ACK channel with physical channel transmission on the basis of the position of the latest symbol of a PDCCH for scheduling transmission of a PUCCH including HARQ-ACK information and the position of the earlier symbol of the start symbol of a PUCCH including HARQ-ACK information and the start symbol of the corresponding physical channel transmission. Specifically, if the earlier symbol of the start symbol of a PUCCH including HARQ-ACK information and the start symbol of another PUCCH is positioned behind the latest symbol of a PDCCH for scheduling transmission of a PUCCH including HARQ-ACK information by $N_2^{+}+d_{2,1}$ symbols or more, the UE may transmit HARQ-ACK information through the PUCCH. If the earliest symbol of the PUSCH is positioned behind the latest symbol of a PDCCH for scheduling the corresponding PUSCH by $N_2^{+}+d_2,1$ symbols or more, the UE may transmit HARQ-ACK information through the PUCCH. $N_2^{+}$ is $N_2+1$. The value $N_2$ follows Table 5.

TABLE 5

| μ | PUSCH preparation time $N_2$ [symbols] |
|---|---|
| 0 | 10 |
| 1 | 12 |
| 2 | 23 |
| 3 | 36 |

In the embodiment in FIG. 16, the symbol interval between the latest symbol of a PDSCH of which the successful or unsuccessful reception is indicated by HARQ-ACK information and the earlier symbol (reference point) of the first symbol of a PUCCH including HARQ-ACK information and the first symbol of a PUSCH satisfies the conditions described above. In addition, the symbol interval between the latest symbol of a PDCCH scheduling PUSCH transmission and the earlier symbol of the first symbol of a PUCCH including HARQ-ACK information and the first symbol of a PUSCH satisfies the conditions described above. Therefore, the UE multiplexes HARQ-ACK transmission with PUSCH transmission. In addition, in these embodiments, the UE may not expect that the PUSCH transmission and PUCCH transmission, which do not satisfy the condition described above, overlap.

If a semi-static HARQ-ACK codebook is configured, DCI for scheduling a PDSCH may indicate the HARQ-ACK timing through a PDSCH-to-HARQ_feeback timing indicator field. The HARQ-ACK timing indicates the slot interval between the PDSCH transmission and the PUCCH transmission including HARQ-ACK information indicating the successful or unsuccessful reception of the corresponding PDSCH. The HARQ-ACK timing is configured without consideration of the above-described conditions related to the latest symbol of a PDSCH. Therefore, there may be a problem in the case where the PDSCH of which the successful or unsuccessful reception is indicated by the HARQ-ACK information indicated by the HARQ-ACK timing does not satisfy the condition related to the latest symbol of a PDSCH. This is due to the fact that the UE is unable to multiplex HARQ-ACK information, including the successful or unsuccessful reception of a PDSCH indicated by the HARQ-ACK timing, with PUSCH transmission or PUCCH transmission. This will be described with reference to FIG. 17.

Figure 17:
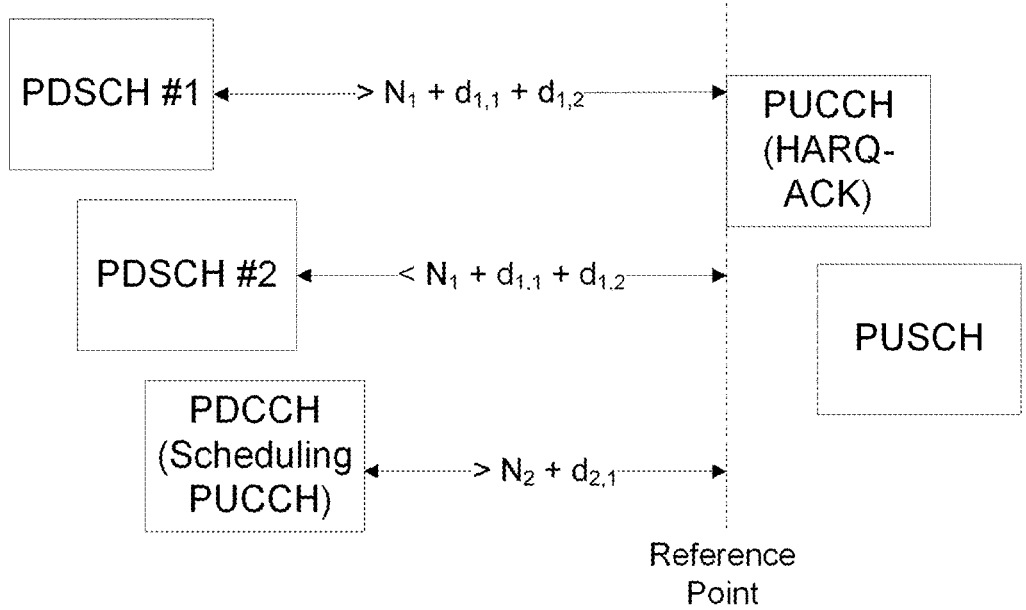
FIG. 17 illustrates a method in which a user equipment performs multiplexing of HARQ-ACK information on the basis of HARQ-ACK timing and the latest symbol of a PDSCH of which the successful or unsuccessful reception is indicated by HARQ-ACK information when multiplexing HARQ-ACK information with PUSCH transmission according to an embodiment of the present invention.

FIG. 17 illustrates a method in which a UE performs multiplexing of HARQ-ACK information on the basis of HARQ-ACK timing and the latest symbol of a PDSCH of which the successful or unsuccessful reception is indicated by HARQ-ACK information when multiplexing HARQ-ACK information with PUSCH transmission according to an embodiment of the present invention If a PDSCH of which the successful or unsuccessful reception is indicated by HARQ-ACK information does not satisfy the above-described conditions related to the latest symbol of a PDSCH by the HARQ-ACK timing, the UE may determine the successful or unsuccessful reception of the PDSCH to be NACK in the HARQ-ACK information regardless of the successful or unsuccessful reception of the corresponding PDSCH. The base station may expect that the successful or unsuccessful reception of the PDSCH is configured as NACK in the HARQ-ACK information. As described above, the conditions related to the latest symbol of the PDSCH may indicate that the earlier symbol of the first symbol of a PUCCH including HARQ-ACK information and the first symbol of another PUCCH is positioned behind the latest symbol of a PDSCH, of which the successful or unsuccessful reception is indicated by HARQ-ACK information, by $N_1^{+}+d_{1,1}+d_{1,2}$ symbols or more.

In the embodiment in FIG. 17, the PDSCHs indicated by the HARQ-ACK timing are a first PDSCH (PDSCH #1) and a second PDSCH (PDSCH #2). The interval between a preceding symbol(reference point) among the latest symbol of the PDSCH in which reception success is indicated by the HARQ-ACK information, the first symbol of the PUCCH including HARQ-ACK information, and the first symbol of the PUSCH and the latest symbol of the first PDSCH (PDSCH #1) is greater than $N_1^{+}+d_{1,1}+d_{1,2}$. In addition, the interval between a preceding symbol(reference point) among the latest symbol of the PDSCH in which reception success is indicated by the HARQ-ACK information, the first symbol of the PUCCH including HARQ-ACK information, and the first symbol of the PUSCH and the latest symbol of the second PDSCH (PDSCH #2) is less than $N_1^{+}+d_{1,1}+d_{1,2}$. In addition, the symbol interval between the latest symbol of a PDCCH scheduling the PUSCH transmission and the earlier symbol of the first symbol of a PUCCH including HARQ-ACK information and the first symbol of a PUSCH is greater than $N_2+d_{2,1}$. Therefore, the UE may multiplex HARQ-ACK information, in which whether the second PDSCH (PDSCH #2) is successfully received is set to NACK and whether the first PDSCH (PDSCH #1) is successfully received is set according to whether the first PDSCH (PDSCH #1) is successfully received, to PUSCH transmission.

In another specific embodiment, if a PDSCH of which the successful or unsuccessful reception is indicated by HARQ-ACK information does not satisfy the above-described conditions related to the latest symbol of a PDSCH by the HARQ-ACK timing, the UE may not multiplex HARQ-ACK information indicating the successful or unsuccessful reception of the corresponding PDSCH with physical channel transmission. In the embodiment in FIG. 17, the UE may multiplex HARQ-ACK information indicating the successful or unsuccessful reception of the first PDSCH (PDSCH #1) with the PUSCH, and may not multiplex the HARQ-ACK information indicating the successful or unsuccessful reception of the second PDSCH (PDSCH #2) with the PUSCH. In this embodiment, the UE does not transmit invalid HARQ-ACK information, thereby reducing the size of UL overhead.

Figure 18:
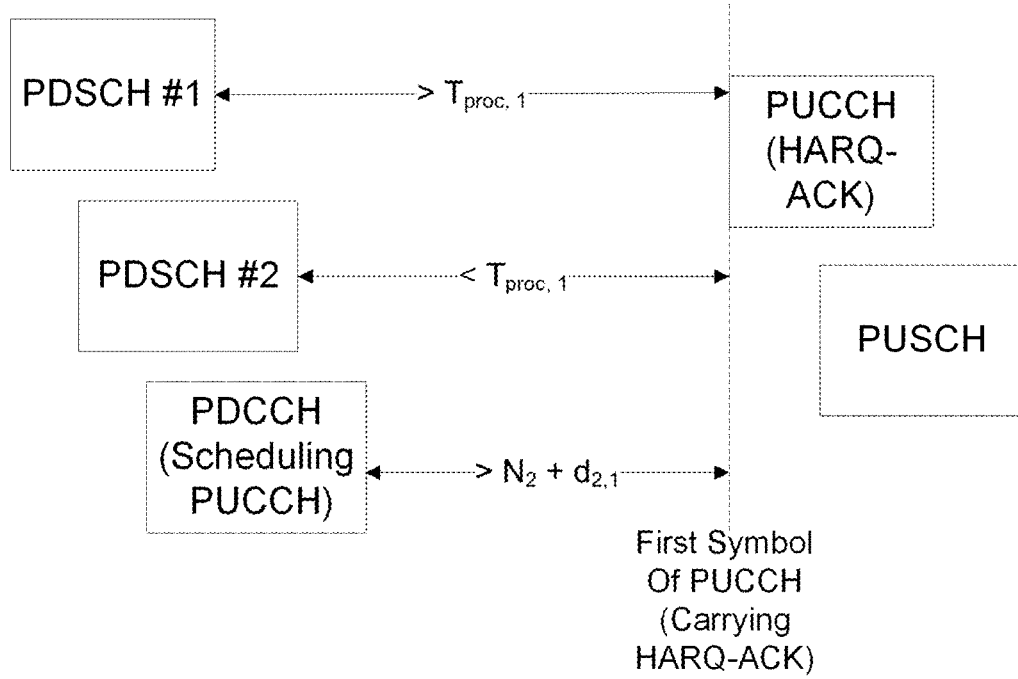
FIG. 18 illustrates a method in which a user equipment performs multiplexing of HARQ-ACK information on the basis of $T_{proc,1}$ and the latest symbol of a PDSCH of which the successful or unsuccessful reception is indicated by HARQ-ACK information when multiplexing HARQ-ACK information with PUSCH transmission according to another embodiment of the present invention.

FIG. 18 illustrates a method in which a UE performs multiplexing of HARQ-ACK information on the basis of $T_{proc,1}$ and the latest symbol of a PDSCH of which the successful or unsuccessful reception is indicated by HARQ-ACK information when multiplexing HARQ-ACK information with PUSCH transmission according to another embodiment of the present invention.

The UE may not determine the above-described conditions related to the latest symbol of a PDSCH for the PDSCH corresponding to invalid HARQ-ACK information. The UE may determine the HARQ-ACK information, which does not satisfy a $T_{proc,1}$ condition, to be invalid HARQ-ACK information. At this time, the $T_{proc,1}$ condition may indicate that the interval between the latest symbol of a PDSCH of which the successful or unsuccessful reception is indicated by HARQ-ACK information and the earliest symbol of a PUCCH including HARQ-ACK information is greater than $T_{proc,1}$. In addition, $T_{proc,1}$ may follow the equation described above. Specifically, Specifically, the UE may determine HARQ-ACK information indicating whether or not the PDSCH located between the earliest symbol of PUCCH including HARQ-ACK, and $T_{proc,\ 1}$ previous symbol is successfully received as invalid HARQ-ACK information. This is due to the fact that the HARQ-ACK information, which does not satisfy the $T_{proc,1}$ condition, is configured as NACK.

In the embodiment in FIG. 18, the interval between the latest symbol of a first PDSCH (PDSCH #1) and the earliest symbol of a PUCCH including HARQ-ACK is greater than $T_{proc,1}$. In addition, the interval between the latest symbol of a second PDSCH (PDSCH #2) and the earliest symbol of a PUCCH including HARQ-ACK is less than $T_{proc,1}$. In addition, the symbol interval between the latest symbol of a PDCCH scheduling PUSCH transmission and the earlier symbol of the earliest symbol of a PUCCH including HARQ-ACK information and the earliest symbol of a PUSCH is greater than $N_2+d_{2,1}$. Therefore, the successful or unsuccessful reception of the second PDSCH (PDSCH #2) may be configured as NACK, and the UE may multiplex HARQ-ACK information, which is configured according to the successful or unsuccessful reception of the first PDSCH (PDSCH #1), with PUSCH transmission by the successful or unsuccessful reception of the first PDSCH (PDSCH #1). In addition, the UE may not determine the above-described conditions related to the latest symbol of a PDSCH for the second PDSCH (PDSCH #2).

In another specific embodiment, the UE may multiplex the remaining, excluding invalid HARQ-ACK information from the HARQ-ACK information of PUCCH transmission overlapping PUSCH transmission, with physical channel transmission. The UE may multiplex the remaining, excluding the HARQ-ACK information that does not satisfy the $T_{proc,1}$ condition from the HARQ-ACK information of PUCCH transmission overlapping PUSCH transmission, with physical channel transmission. According to the embodiment in FIG. 18, the UE may multiplex only the HARQ-ACK information indicating the successful or unsuccessful reception of the first PDSCH (PDSCH #1) with PUSCH transmission, excluding the HARQ-ACK information indicating the successful or unsuccessful reception of the second PDSCH (PDSCH #2). The UE may reduce the size of UL overhead through this embodiment.

In the embodiments described above, the UE may determine the conditions related to the latest symbol of a PDSCH only for the PDSCH indicated by the PDCCH of which the reception is successful. If a semi-static HARQ-ACK codebook is configured, the semi-static HARQ-ACK codebook may include HARQ-ACK information indicating the successful or unsuccessful reception of the PDSCH indicated by the PDCCH of which the reception is not successful or the PDSCH indicated by the PDCCH that the base station has not transmitted. At this time, the UE may determine the conditions related to the latest symbol of a PDSCH only for the PDSCH indicated by the PDCCH of which the reception is successful. This is due to the fact that the UE does not receive the PDSCH indicated by the PDCCH of which the reception is not successful.

In addition, in the embodiments described above, the value $d_{1,1}$ may be fixed to the maximum value available to $d_{1,1}$. In addition, the value $d_{1,2}$ may be fixed to the maximum value available to $d_{1,2}$. This is due to the fact that the UE is not aware of value $d_{1,1}$ and the value $d_{1,2}$ if the PDCCH scheduling a PDSCH is not received. In the embodiments above, $d_{1,1}$ may be 1. In addition, $d_{1,2}$ may be 6 or 5.

In the embodiments described above, the physical data channel may include a PDSCH or a PUSCH. In addition, the physical control channel may include a PDCCH or a PUCCH. In addition, the embodiments in which a PUSCH, a PDCCH, a PUCCH, and a PDCCH are described by way of example may be applied to other types of data channels and control channels.

Although the method and the system of the present invention have been described in connection with specific embodiments, some or all of the elements or operations thereof may be implemented using a computing system having general-purpose hardware architecture.

The above description of the present invention is provided only as examples, and those of ordinary skill in the art will be able to understand that the present invention can be easily modified into other specific forms without changing the technical spirit or essential features of the present invention. Therefore, it should be understood that the embodiments described above are illustrative in all respects and are not intended to limit the present invention. For example, the respective elements described as a single type may be implemented in separate forms, and similarly, the elements described as being separate may also be implemented in an integrated form.

The scope of the present invention is indicated by the claims to be described later rather than the detailed description above, and all changes or modified forms derived from the meaning and scope of the claims and their equivalent concepts should be interpreted as being included in the scope of the present invention.

The invention claimed is:

1. A user equipment in a wireless communication system, the user equipment comprising:
a communication module; and
a processor configured to control the communication module, wherein the processor is configured to,
receive downlink control information (DCI) of a physical downlink control channel (PDCCH) for scheduling transmission of a physical uplink shared channel (PUSCH) in a plurality of slots, and
multiplex a hybrid automatic repeat request (HARQ)-acknowledgement (ACK) information to PUSCH transmission for at least one slot among the plurality of slots,
wherein the at least one slot is determined according to whether the HARQ-ACK information is multiplexed in the PUSCH transmission for each of the plurality of slots, and
wherein each of the at least one slot is multiplexed to the PUSCH transmission by applying the same value of a downlink assignment index (DAI) field included in the DCI.

2. The user equipment of claim 1, wherein the processor is further configured to identify a number of physical downlink shared channel (PDSCH)s to transmit an HARQ-ACK based on the HARQ-ACK information in each of the at least one slot according to a specific value indicated by the DAI field of the DCI.

3. The user equipment of claim 2,
wherein the specific value is '1' when 2 bits of the DAI field are '00',
wherein the specific value is '2' when 2 bits of the DAI field are '01',
wherein the specific value is '3' when 2 bits of the DAI field are '10', and
wherein the specific value is '4' when 2 bits of the DAI field are '11'.

4. The user equipment of claim 1, wherein the at least one slot is determined by excluding one or more slots satisfying a specific condition in which HARQ-ACK cannot be multiplexed for PUSCH transmission in the plurality of slots.

5. The user equipment of claim 4, wherein the specific condition is that there is no PUSCH transmission in the one or more slots, the PDSCH indicating whether reception is successful or not is not received by the HARQ-ACK information to be transmitted in the one or more slots, or the PDCCH scheduling transmission of a PUCCH including HARQ-ACK information is not received.

6. The user equipment of claim 1, wherein a slot, which is not indicated by a PDSCH-to-HARQ feedback timing indicator field, among the at least one slot is multiplexed with the HARQ-ACK information in which the PDSCH is successfully received or not is set to NACK in the PUSCH transmission.

7. The user equipment of claim 1,
wherein the HARQ-ACK information is multiplexed to PUSCH transmission in the at least one slot according to whether the at least one slot satisfies a processing timing condition of the PDCCH for scheduling transmission of a PDSCH indicating whether or not reception is successful by the HARQ-ACK information and a physical uplink control channel (PUCCH) including the HARQ-ACK information, and
wherein the processing timing condition is determined according to a minimum time required for the user equipment to receive the PDCCH and to generate valid HARQ-ACK information.

8. The user equipment of claim 7,
wherein the HARQ-ACK information is not multiplexed to the PUSCH transmission in the at least one slot when the at least one slot does not satisfy the processing timing condition.

9. The user equipment of claim 7, wherein a bit of the HARQ-ACK information corresponding to the PDSCH that does not satisfy the processing timing condition is set to NACK when the at least one slot does not satisfy the processing timing condition.

10. The user equipment of claim 7, wherein the processing timing condition is determined on the basis of the position of the latest symbol of the PDSCH of which the successful or unsuccessful reception is indicated by the HARQ-ACK information and the position of the earlier symbol of a start symbol of a PUCCH including the HARQ-ACK information and a start symbol of PUSCH transmission over the plurality of slots.

11. A method of operating a user equipment in a wireless communication system, the method comprising:
receiving downlink control information (DCI) of a physical downlink control channel (PDCCH) for scheduling transmission of a physical uplink shared channel (PUSCH) in a plurality of slots; and
multiplexing a hybrid automatic repeat request (HARQ-acknowledgement(ACK) information to PUSCH transmission for at least one slot among the plurality of slots,
wherein the at least one slot is determined according to whether HARQ-ACK information is multiplexed in the PUSCH transmission for each of the plurality of slots, and
wherein each of the at least one slot is multiplexed to the PUSCH transmission by applying the same value of a downlink assignment index (DAI) field included in the DCI.

12. The method of claim 11, further comprising identifying a number of PDSCHs to transmit an HARQ-ACK based on the HARQ-ACK information in each of the at least one slot according to a specific value indicated by the DAI field of the DCI.

13. The method of claim 12,
wherein the specific value is '1' when 2 bits of the DAI field are '00',
wherein the specific value is '2' when 2 bits of the DAI field are '01',
wherein the specific value is '3' when 2 bits of the DAI field are '10', and
wherein the specific value is '4' when 2 bits of the DAI field are '11'.

14. The method of claim 11, wherein the at least one slot is determined by excluding one or more slots satisfying a specific condition in which HARQ-ACK cannot be multiplexed for the PUSCH transmission in the plurality of slots.

15. The method of claim 14, wherein the specific condition is that there is no PUSCH transmission in the one or more slots, the PDSCH indicating whether reception is successful or not is not received by the HARQ-ACK information to be transmitted in the one or more slots, or the PDCCH scheduling transmission of a PUCCH including HARQ-ACK information is not received.

16. The method of claim 11, wherein a slot, which is not indicated by a PDSCH-to-HARQ feedback timing indicator field, among the at least one slot is multiplexed with the HARQ-ACK information in which the PDSCH is successfully received or not is set to NACK in the PUSCH transmission.

17. The method of claim 11,
wherein the HARQ-ACK information is multiplexed to the PUSCH transmission in the at least one slot according to whether the at least one slot satisfies a processing timing condition of the PDCCH for scheduling transmission of a PDSCH indicating whether or not reception is successful by the HARQ-ACK information and a physical uplink control channel (PUCCH) including the HARQ-ACK information, and
wherein the processing timing condition is determined according to a minimum time required for the user equipment to receive the PDCCH and to generate valid HARQ-ACK information.

18. The method of claim 17,
wherein a bit of the HARQ-ACK information corresponding to the PDSCH that does not satisfy the processing timing condition is set to NACK when the at least one slot does not satisfy the processing timing condition.

19. The method of claim 17,
wherein the processing timing condition is determined on the basis of the position of the latest symbol of the PDSCH of which the successful or unsuccessful reception is indicated by the HARQ-ACK information and the position of the earlier symbol of a start symbol of a PUCCH including the HARQ-ACK information and a start symbol of the PUSCH transmission over the plurality of slots.

\* \* \* \* \*